(12) United States Patent
Yuasa et al.

(10) Patent No.: US 8,139,292 B2
(45) Date of Patent: Mar. 20, 2012

(54) STRUCTURAL BODY, A METHOD FOR READING A STRUCTURAL COLOR AND/OR DIFFRACTION LIGHT, AND A TRUTH/FALSE DISCRIMINATING METHOD

(75) Inventors: Yoshiyuki Yuasa, Yokohama (JP); Ken Takenouchi, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 581 days.

(21) Appl. No.: 12/225,810

(22) PCT Filed: Apr. 12, 2007

(86) PCT No.: PCT/JP2007/058048
§ 371 (c)(1),
(2), (4) Date: Sep. 30, 2008

(87) PCT Pub. No.: WO2007/119773
PCT Pub. Date: Oct. 25, 2007

(65) Prior Publication Data
US 2009/0174944 A1 Jul. 9, 2009

(30) Foreign Application Priority Data

Apr. 12, 2006 (JP) ................. 2006-109958
Mar. 9, 2007 (JP) ................. 2007-059529

(51) Int. Cl.
G02B 5/18 (2006.01)
G02B 27/44 (2006.01)
G03H 1/00 (2006.01)
(52) U.S. Cl. .......................... 359/566; 359/2
(58) Field of Classification Search ............... 359/2, 567
See application file for complete search history.

(56) References Cited

U.S. PATENT DOCUMENTS
6,631,033 B1 * 10/2003 Lewis ..................... 359/584
(Continued)

FOREIGN PATENT DOCUMENTS
EP  1 164 113 B1  9/2004
(Continued)

OTHER PUBLICATIONS

Applied surface science "A journal devoted to the properties of interfaces in relation to the synthesis and behaviour of materials" Editors: L.C. Feldman, Murry Hill, NJ, USA, J.Nishizawa, Sendai, Japan, W.F. van der Weg, Utrecht, The Netherlands, vol. 69, Nos. 1-4, May (II) 1993, Material Surface Processing, Proceedings of Symposium B on Laser, Lamp and Synchrotron Assisted Materials Surface Processing of the 1992 E-MRS Spring Conference Strasbourg, France, Jun. 2-5, 1992, Edited by M. Stuke, EE Marinero and I. Nishiyama, ASUSEE 69(1-4), 1-450(1993).

(Continued)

Primary Examiner — Alessandro Amari
(74) Attorney, Agent, or Firm — Manabu Kanesaka

(57) ABSTRACT

Decoration of a material is enabled with a high degree of recycling properties while satisfying the requirements for putting a structural color into practical use on the industrial scale. Furthermore, whether an object is genuine or not can be verified easily, and reusing by peeling as in the case of a hologram seal is prevented.

A cavity 12 having a periodic structure 13 causing optical diffraction is formed in the inside of a substrate 11, and a periodic structure 15 causing optical diffraction is formed on part or the whole of the substrate 11. These cavity interface periodic structure 13 and the substrate surface periodic structure 15 have a regular arrangement developing a structural color. In addition, by bringing a functional material to be in contact with the substrate surface periodic structure 15, development of a structural color by the substrate surface periodic structure 15 is suppressed, thereby enabling a structural color developed by the cavity interface periodic structure 13 to be read.

11 Claims, 25 Drawing Sheets

U.S. PATENT DOCUMENTS

| | | | |
|---|---|---|---|
| 2003/0111665 A1* | 6/2003 | Geusic et al. | 257/64 |
| 2005/0174643 A1 | 8/2005 | Lee et al. | |
| 2005/0219702 A1* | 10/2005 | Nakai | 359/573 |

FOREIGN PATENT DOCUMENTS

| | | |
|---|---|---|
| JP | H06-059612 | 3/1994 |
| JP | H09-006217 | 1/1997 |
| JP | H10-069673 | 3/1998 |
| JP | 2002-087834 | 3/2002 |
| JP | 2003-021719 | 1/2003 |
| JP | 2004-093461 | 3/2004 |
| JP | 2004-359344 A | 12/2004 |
| JP | 2006-084635 | 3/2006 |
| WO | WO 03/019250 A1 | 3/2003 |
| WO | WO 2004/113959 | 12/2004 |
| WO | WO 2005/105662 A2 | 11/2005 |

OTHER PUBLICATIONS

The Japan Society of Laser Technology, vol. 30 No. 2, ISSN 1916-7277 issued on May 31, 2005, vol. 30, No. 2, "Special Topic: Laser Processing and its surroundings".

J. Ihlemann et al., "Nanosecond and Femtosecond Excimer Laser Ablation of Fused Silica", Jan. 1, 1992, pp. 363-368.

P. Dainesi et al., "Optimization of a beam delivery system for a short-pulse KrF laser used for material ablation", Sep. 20, 1997, pp. 7080-7085.

J. Ihlemann et al., "Near UV Laser Ablation of Doped Polymers", Jan. 1, 1990, Physical Concepts of Materials for Novel Optoelectronic Device Applications 1: Materials Growth and Characterization.

\* cited by examiner

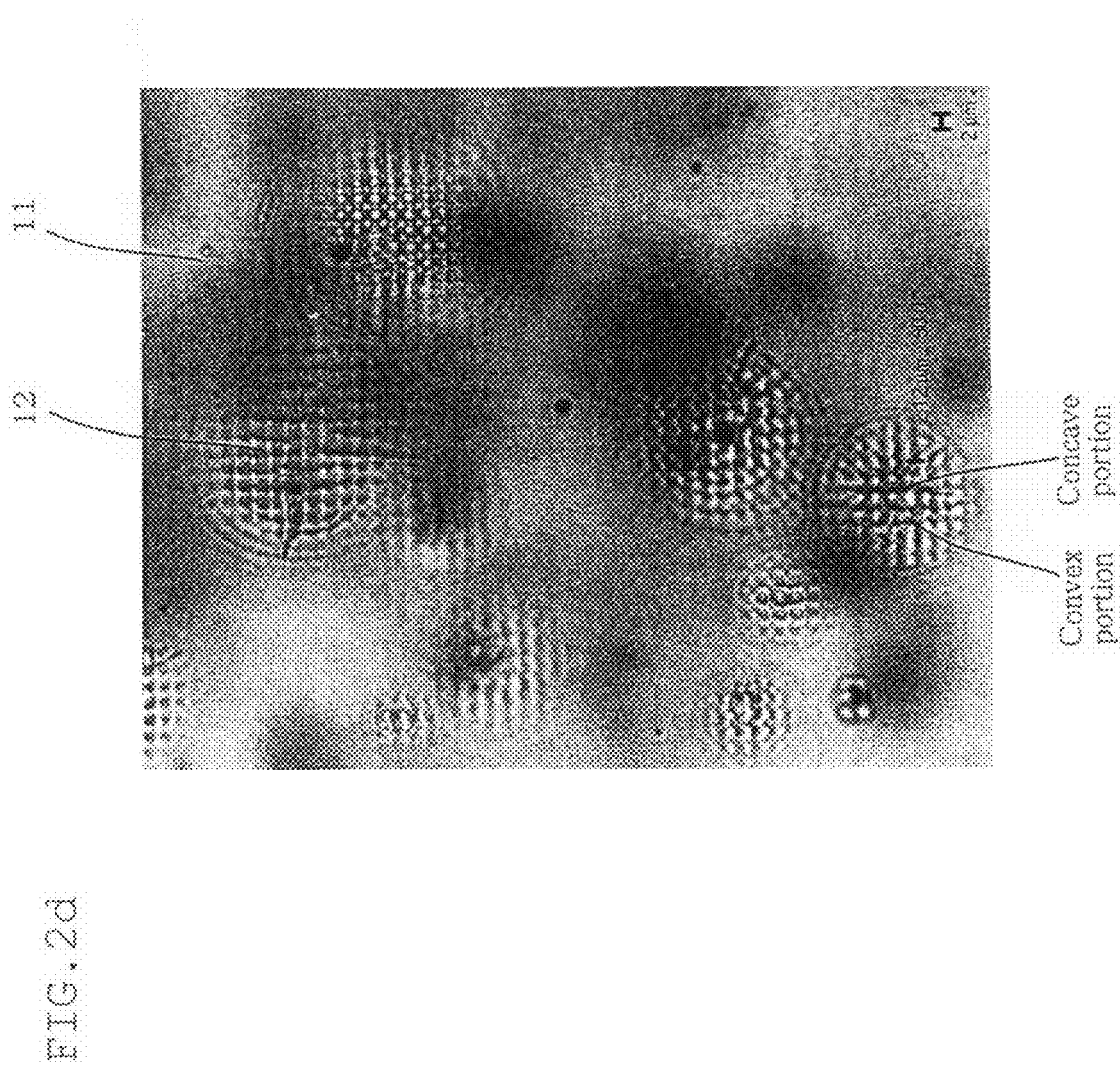

FIG.20
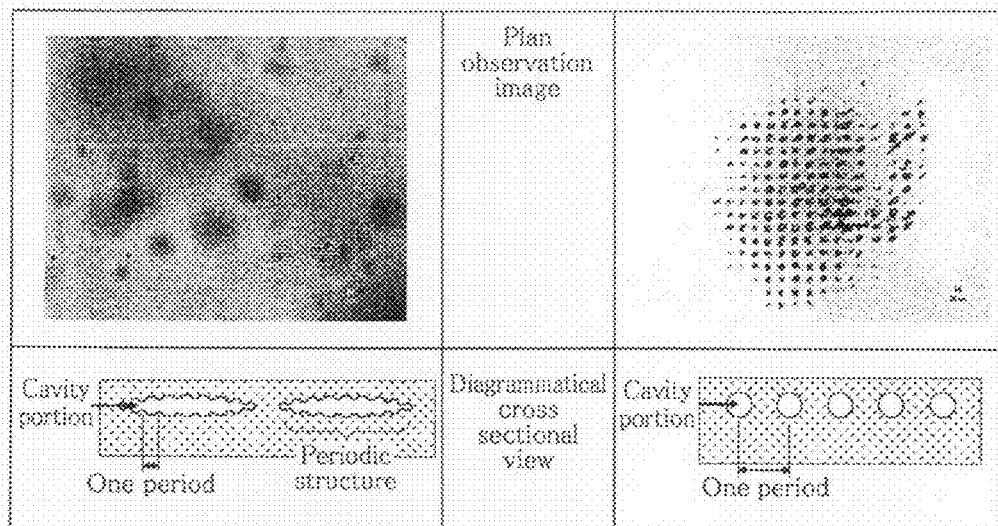
FIG.21
| Example | | Comparative Example |
|---|---|---|
| Biaxial elongated PET sheet (thickness:150μm) | Sample | Injection molded PET sheet in which a light-absorbing heat generator has been kneaded (thickness:1.5mm) |
| 83% | Transmittance @355nm | 0% |
FIG.22
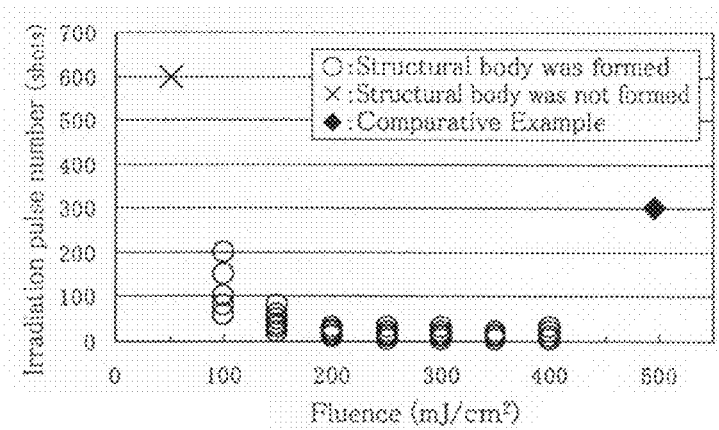

US 8,139,292 B2

STRUCTURAL BODY, A METHOD FOR READING A STRUCTURAL COLOR AND/OR DIFFRACTION LIGHT, AND A TRUTH/FALSE DISCRIMINATING METHOD

TECHNICAL FIELD

The invention relates to a structural body having optical-control function utilizing optical phenomenon such as diffraction and interference, a method for reading a structural color and/or diffraction light developed by this structural body, and a truth/false discrimination method using this structural body. In particular, the invention relates to a structural body which can be served as a marking having forgery-protection effects, which develops a structural color by a periodic structure formed in the interface of a cavity formed within the body, can prevent illegal reuse and facilitates truth/false verification, a method for reading a structural color and/or diffraction light, and a truth/false discrimination method.

BACKGROUND

In recent years, chemical color development using pigment substances has become unacceptable in view of recycling properties and environmental protection. Under such circumstances, a structural color which develops a color utilizing a phenomenon such as diffraction and interference of light by forming a fine structure has come to be an important technique replacing the chemical color development.

A structural color is generated, for example, by thin film interference, multilayer interference, light scattering phenomenon, diffraction lattice and photonic crystals.

It is difficult to cause such a structural color to be developed artificially. There are very few cases where structural colors are developed on the industrial scale.

As one of these few cases, a method has been proposed in which a fine periodic structure is formed by light irradiation, thereby developing a structural color.

As examples of the fine periodic structure formed by light irradiation, LIPS (Laser Induced Periodic Structures) (see Non-Patent Document 1, for example) can be given, for example. The LIPS are fine periodic structures which are formed by laser irradiation on the surface of a material in a self-organized manner.

As another example, a technology is disclosed in which a diffraction lattice is formed in the inside of glass by means of a femtosecond laser (see Non-Patent Document 2, for example).

Non-Patent Document 1: Sylvain Lazare: "Large scale excimer laser production of submicron periodic structures on polymer surface" Applied Surface Science 69 (1993) 31-37, North-Holland Non-Patent Document 2: Journal of Japanese Society of Laser Technology, Vol. 30, issue 2, Hideo Hosono and Kenichi Kawamura, "Interaction between Femtosecond Laser and Transparent Substance Decoration of a Transparent Substance with a Periodic Nanostructure by a Single Pulse Interference", Japanese Society of Laser Technology, May 2005, pages 7-12.

DISCLOSURE OF THE INVENTION

Problems to be Solved by the Invention

However, to put a structural color into practical use, the resistance to scars or stains which may hinder color development, high color development efficiency and capability of being produced at low cost are requirements. It is not easy to meet these three requirements.

For example, the technology disclosed in the Non-Patent Document 1 is the one in which a fine periodic structure is formed on the surface of a material. The fine periodic structure formed on the surface has the problem that it does not have resistance to scars and stains which hinder optical diffraction, and eventually deteriorate color developability.

On the other hand, a technology disclosed in Non-Patent Document 2 is free from problems such as poor resistance to scars since diffraction lattices are formed in the inside of the glass. However, since a lattice pattern can be formed only on one site by a single laser irradiation, an extremely long period of time is required to decorate a large area, resulting in poor productivity.

In the case of commercial transactions, products must be strictly genuine in order to keep the order of transactions, as well as to protect consumers. However, the circulation of forgeries obtained by duplicating and imitating genuine products with the aim of taking advantage of genuine products to gain illegal profits happens all too often. Circulation of poor-quality forgeries not only decreases the profits of the manufacturers of genuine products but also causes consumers to distrust in the manufacturers of genuine products. As a result, corporate images may deteriorate, and as a result, corporate power of the brand may be impaired.

In order to avoid economical damage caused by the circulation of forgeries, many manufacturers take measures to distinguish genuine products from forgeries. As one of such measures, forgery protection markings can be given. Examples of these include hard-to-duplicate markings which are attached to an object as the proof of a genuine product. Specific examples of these include a hologram seal in which a relief-type hologram image is formed (see JP H06-059612 ((Patent Document 1) and Japanese Patent No. 3546975 (Patent Document 2), for example).

Since not only an advanced level of optical design technology is required but also a complicated material constitution and an expensive hologram original plate are also required, duplication of a hologram seal with the intent of forgery is difficult. Hologram seals are widely used since they have forgery protection effects due to the above-mentioned difficulty in duplication, the capability of being discriminated at one glance due to its unique color tone, and easiness in handling which requires only physical attachment.

However, a hologram seal has the defect that it can be peeled off relatively easily from an existing object and can be reused simply by attaching to another object. A hologram seal is attached as the proof of a genuine product. Therefore, if the removed original seal is attached to a forged product, it becomes impossible to verify that the product to which the seal has been attached is a forgery.

The hologram seal disclosed in Patent Document 2 has a configuration in which a peelable layer is provided on an inner layer of the seal, whereby the seal itself is destroyed when the seal is peeled off intentionally. Due to the destruction, reuse of the peeled seal can be prevented. However, provision of a peelable layer makes the material constitution or manufacturing technique complicated, leading to an increase in cost.

If the hologram seal is duplicated in a more elaborate fashion, to verify whether the attached hologram seal is real or not, fine detailed portions have to be compared carefully. Such comparison cannot be done easily by consumers.

The invention has been made in view of the above-mentioned circumstances, and the object thereof is to provide a structural body, a method for forming a structural body, an apparatus for forming a structural body, a method for reading a structural color and/or diffraction light, and a truth/false discrimination method, which satisfy the requirements for practical application of a structural color on the industrial scale, enable quick formation of a fine periodic structure to improve productivity, prevent reuse by peeling, and can perform truth/false verification easily.

Means for Solving the Problems

In order to solve the problem, the structural body of the invention has a configuration in which a cavity with a periodic structure causing optical diffraction being formed in the interface thereof is formed in the inside of a substrate.

Due to such a configuration of the structural body, it is possible to satisfy the requirements for putting a structural color into practical use on the industrial scale.

For example, since a fine periodic structure is formed in the inside of a material, it is possible to allow the structural body to have resistance to scars or stains. In addition, since a periodic structure is formed in a three-dimensional manner, color development efficiency can be improved. Furthermore, a plurality of cavities is formed in a broad range by performing light irradiation for a short period of time, for example, with several laser shots. As a result, high-speed production is realized to enable production to be performed at a low cost. As mentioned above, it is possible to satisfy requirements for putting a structural color into practical use on the industrial scale.

Furthermore, a color is developed structurally by a fine periodic structure formed in the interface of the cavity (cavity interface periodic structure), not chemically by using pigments or dyes. Therefore, the color can vanish easily by melting. Accordingly, the structural color of the invention can be used as a technology of decorating plastic apparatuses with a high degree of recycling properties.

The structural body of the invention may have a configuration in which the cavity interface periodic structure within the substrate has a regular arrangement which develops a structural color.

Due to such a configuration of the structural body, a structural color can be developed by the regular arrangement of the periodic structure. This leads to the proposal of an unconventional, novel decorating technique.

The structural body of the invention may have a configuration in which a plurality of cavities is formed at different depths from the surface of the substrate.

Due to such a configuration of the structural body, each of the plurality of cavities serves as a diffraction lattice, and different colors may be developed depending on a light incident angle or on a viewing angle.

That is, a plurality of cavities is generated at arbitrary positions at different depths within a light-irradiated area. As a result, in the entire light-irradiated area, the periodic structure is formed three dimensionally (three-dimensional periodic structure), whereby color developability can be significantly improved.

In addition, the structural body of the invention has a configuration in which a cavity with a periodic structure causing optical diffraction being formed in the interface thereof is formed in the inside of a substrate, as well as has a configuration in which a periodic structure causing optical diffraction is formed on part or the whole of the surface of the substrate.

By allowing the structural body to have such a configuration, since the periodic structure is formed in the structural body itself, peeling the periodic structure for reusing purposes is impossible. Therefore, it is possible to prevent such an act of removing the periodic structure from an existing object like a hologram seal and attaching the removed seal to a forgery to allow the forgery to be circulated as a genuine product.

In addition, due to a configuration in which a periodic structure is formed in the interface of a cavity or on the surface of a substrate, the material constitution is simplified to prevent an increase in cost.

Furthermore, since a periodic structure is formed in the interface of a cavity or on the surface of a substrate, a structural color is developed according to the periodic structure. Since a structural color developed by a periodic structure formed in the interface of the cavity can be read by suppressing the development of a structural color developed by a periodic structure formed on the surface of the substrate, even a consumer can verify easily whether an object is genuine or not.

In addition, the structural body: of the invention may have a configuration in which the periodic structure formed on the surface of the substrate (substrate surface periodic structure) has a regular arrangement which develops a structural color.

If the structural body has such a configuration, the cavity interface periodic structure or the substrate surface periodic structure may develop a structural color based on the regular arrangement.

The structural body of the invention may have a protective layer for protecting a periodic structure formed on the substrate surface.

Due to such a configuration, the substrate surface periodic structure can be prevented from being damaged, and deterioration of the truth/false discrimination function can be eliminated.

In the structural body of the invention, a substrate surface periodic structure may be formed at a position which hides a structural color and/or diffraction light by a periodic structure formed in the interface of the cavity.

Due to such a configuration, by suppressing the development of a structural color caused by the substrate surface periodic structure, it is possible to read a structural color which has been hidden (a structural color caused by the cavity interface periodic structure).

In addition, in the structural body of the invention, the cavity interface periodic structure and/or the substrate surface periodic structure may be formed by light irradiation.

Due to such a configuration of the structural body, the cavity interface periodic structure or the substrate surface periodic structure may be formed by a relatively simple manufacturing technique, whereby an increase in cost can be suppressed.

The structural body of the invention may be formed by light irradiation while generating a periodic intensity distribution.

By this method for forming a structural body, due to the generation of the periodic intensity distribution, the cavity interface periodic structure or the substrate surface interface structure can be formed.

The method for forming a structural body of the invention comprises irradiating a substrate with light by using an apparatus for forming a structural body to cause a cavity to be formed in the inside of the substrate and forming a periodic structure in the interface of the cavity.

By this method for forming a structural body, by irradiating a material with light, a cavity with a periodic structure causing optical diffraction being formed in the interface thereof can be formed in the inside of the irradiated material. As a result, a structural color satisfying the requirements for practical application on the industrial scale can be obtained.

The method for forming a structural body of the invention comprises irradiating the substrate with light having a wavelength within a wavelength region which allows the substrate to show transparency.

By this method for forming a structural body, by irradiating the substrate with light having a wavelength within a wavelength region which allows the substrate to show transparency, a cavity interface periodic structure can be formed.

The method for forming a structural body of the invention comprises irradiating the substrate with light having a wavelength different from that of light used for forming the cavity, thereby allowing a periodic structure to be formed on part or the whole of the surface of the substrate.

By this method for forming a structural body, the cavity interface periodic structure or the substrate surface periodic structure can be formed by a simple method.

The method for forming a structural body of the invention comprises irradiating the substrate simultaneously with light having a wavelength within a wavelength region which allows the substrate to show transparency and light having a wavelength within a wavelength region which allows the substrate to show opacity.

By this method for forming a structural body, the cavity interface periodic structure can be formed by irradiating the substrate with light having a wavelength within a wavelength region which allows the substrate to show transparency, and the substrate surface periodic structure can be formed by irradiating the substrate with light having a wavelength within a wavelength region which allows the substrate to show opacity. As compared with the case where these two types of light are irradiated separately, the simultaneous irradiation of these two types of light allows the production time of the structural body to be shortened.

The method for forming a structural body of the invention comprises irradiating the substrate with light having a wavelength within a wavelength region which allows the substrate to show opacity after irradiating with light having a wavelength within a wavelength region which allows the substrate to show transparency.

By this method of forming a structural body, it is possible to form the cavity interface periodic structure accurately, followed by formation of the substrate periodic structure.

The method for forming a structural body of the invention comprises irradiating the substrate with light such that a periodic intensity distribution is generated.

By this method for forming a structural body, the periodic structure can be formed in the interface of the cavity or on the surface of the substrate by causing a periodic light intensity distribution to be generated.

The apparatus for forming a structural body of the invention is a structural body-forming apparatus which irradiates light to the substrate. The apparatus comprises a laser oscillator which adjusts irradiation pulse number and/or laser output so that a periodic structure causing optical diffraction can be formed in the interface of the cavity which is formed in the inside of the substrate.

By allowing the apparatus for forming a structural body to have such a configuration, fluence or irradiation pulse number can be adjusted to a suitable level, a cavity with a periodic structure being formed in the interface thereof can be formed within a material. As a result, a structural color satisfying the requirements for practical application on the industrial scale can be obtained.

In the apparatus for forming a structural body of the invention, the laser oscillator adjusts the irradiation pulse number and/or laser output such that a periodic structure causing optical diffraction is formed on the surface of the substrate.

By allowing the apparatus for forming a structural body to have such a configuration, by adjusting irradiation pulse number or laser output, a cavity with a periodic structure causing optical diffraction being formed in the interface thereof can be formed in the inside of the substrate, andacavity with a periodic structure causing optical diffraction can be formed on the surface of the substrate.

The method for reading a structural color and/or diffraction light according to the invention comprises bringing a structural body into contact with a functional material having a refractive index which is the same or close to the refractive index of a substrate of the structural body to suppress a structural color and/or diffraction light caused by the periodic structure on the substrate surface, and reading a structural light and/or diffraction light caused by the cavity interface periodic structure in the inside of the substrate.

By this method for reading a structural color and/or diffraction light, a structural color or diffraction light caused by the cavity interface periodic structure, which has been hidden, can be read by a simple method in which a functional material is brought into contact with the substrate.

The truth/false discrimination method of the invention comprises bringing a functional material having a refractive index which is the same or close to that of a substrate of the structural body to suppress a structural color and/or diffraction light caused by a periodic structure on the surface of a substrate, reading a structural color and/or diffraction light caused by a periodic structure in the interface of a cavity in the inside of the substrate, comparing the structural color and/or the diffraction light which has been read with a structural color and/or diffraction light of a structural body for comparison, and judging that an object having the structural body is genuine when the structural color and the diffraction light of the structural body coincide with the structural color and diffraction light of the structural body for comparison.

By the above-mentioned truth/false discrimination method, it is possible to verify by a simple method whether an object is genuine or not based on the structural color and/or diffraction light which has been read.

For example, if the shape formed by the structural color which has been read is a star, and the shape formed by the structural color for comparison is also a star, an object which has the structural body is verified to be genuine. If the shape formed by the structural color which has been read is different from the shape formed by the structural color for comparison, an object which has the structural body is verified to be a forgery. In addition, an object of which the structural color cannot be read even when bringing into contact with a functional material due to the absence of the cavity is also verified to be a forgery.

Effects of the Invention

As mentioned above, according to the invention, a structural color satisfying the requirements for practical application on the industrial scale can be obtained.

Furthermore, the structural color of the invention can be effectively used for decorating plastic apparatuses or the like with a high degree of recycling properties.

In addition, since the cavity interface periodic structure or the substrate surface periodic structure are formed in the substrate itself, it is impossible to remove them for reuse. As a result, a damage caused by reusing it in a forgery, which occurs in the case of forgery protection seals, can be prevented.

Furthermore, the cavity interface periodic structure is formed within the substrate, and the substrate surface periodic structure is formed on the surface of the substrate. Since each periodic structure develops a structural color, the structural color generated by the cavity interface periodic structure is hidden by the structural color generated by the substrate surface periodic structure.

In addition, by suppressing development of a structural color by bringing a functional material into contact with the substrate surface periodic structure, it is possible to read a shape formed by the structural color generated by the cavity interface periodic structure. Whether an object is genuine or not can be verified by comparing the shape which has been read with a shape for comparison. Accordingly, even a consumer can verify whether an object having a structural body is genuine or not by a simple method in which a functional material is brought into contact with the substrate surface periodic structure.

BRIEF DESCRIPTION OF THE DRAWINGS

FIG. 2d is an enlarged microscopic image of a cavity when the structural body is viewed from top (direction A in FIG. 2c);

FIG. 20 shows plan observation images and diagrammatical cross sectional views of the cavity of the invention and the cavity of the Comparative Example;

FIG. 21 is a table showing comparison between the laser irradiation conditions in Examples of the invention and the laser irradiation conditions in the Comparative Example; and FIG. 22 is a graph showing comparison between laser irradiation conditions in the Example of the invention and laser irradiation conditions in the Comparative Example.

EXPLANATION OF NUMERALS

Figure 1:
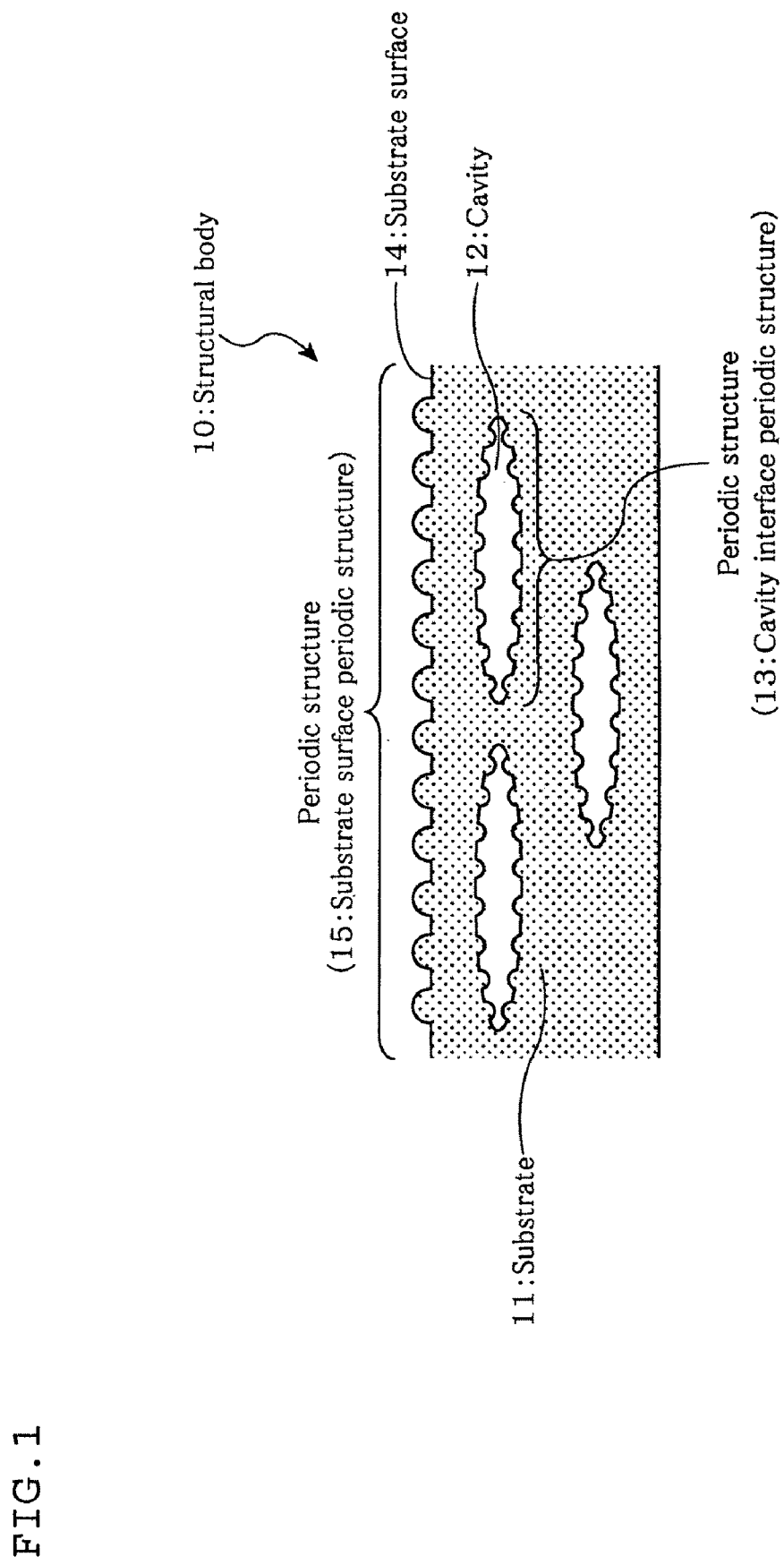
FIG. 1 is a cross-sectional view diagrammatically showing the structure of a structural body of this embodiment.

10. Structural body
11. Substrate
12. Cavity
13. Cavity interface periodic structure
14. Substrate surface
15. Substrate surface periodic structure
16. Protective layer
20. Apparatus for forming a structural body using a transmitting diffraction optical device
21. Laser oscillator
23. Transmitting diffraction optical device
25. Mask
30. Apparatus for forming a structural body using a micro-lens array
35. Micro-lens array
36. Mask

BEST MODE FOR CARRYING OUT THE INVENTION

Preferred embodiments of the structural body, the method for forming a structural body, the apparatus for forming a structural body, the method for reading a structural color and/or diffraction light, and the truth/false discrimination method will be explained below with reference to the drawings.

In the embodiment, "decorating" implies coloring a package with a chromatic color or shielding light in a specific wavelength region to prevent it from being penetrated into the inside of the package.

[Structural Body]

The embodiments of the structural body of the invention will be explained with reference to FIGS. 1 to 3c.

Figure 2A:
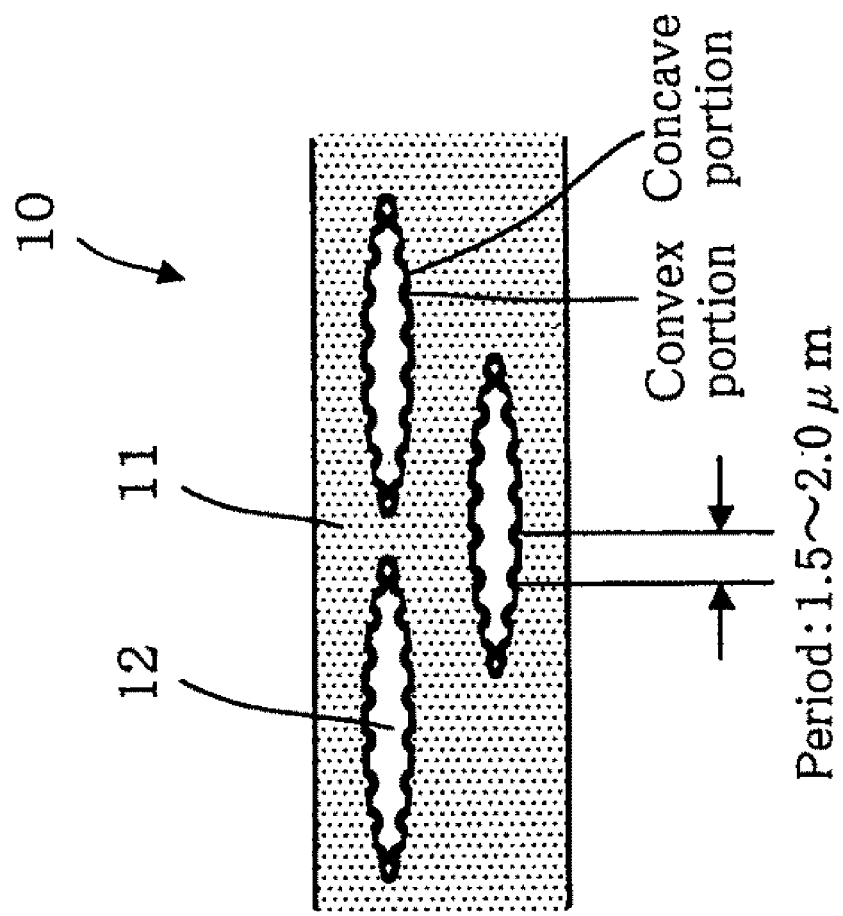
FIG. 2a is a diagrammatical view showing the cross section of the structural body in which a cavity is formed.
Figure 2B:
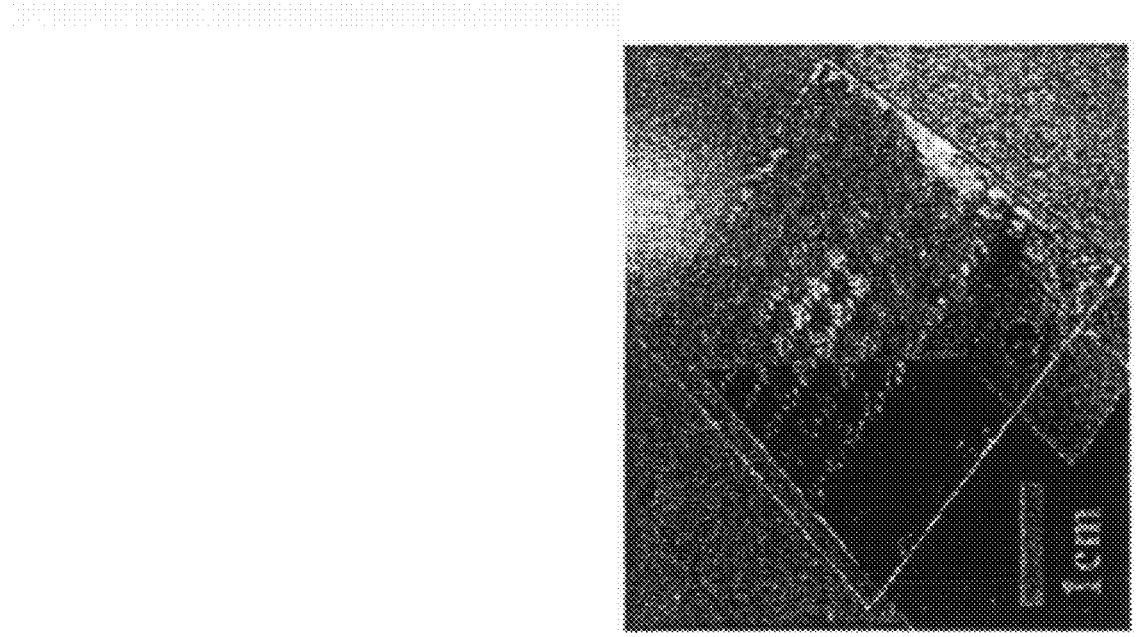
FIG. 2b is a perspective view showing the appearance of the structural body in which a cavity is formed.
Figure 2C:
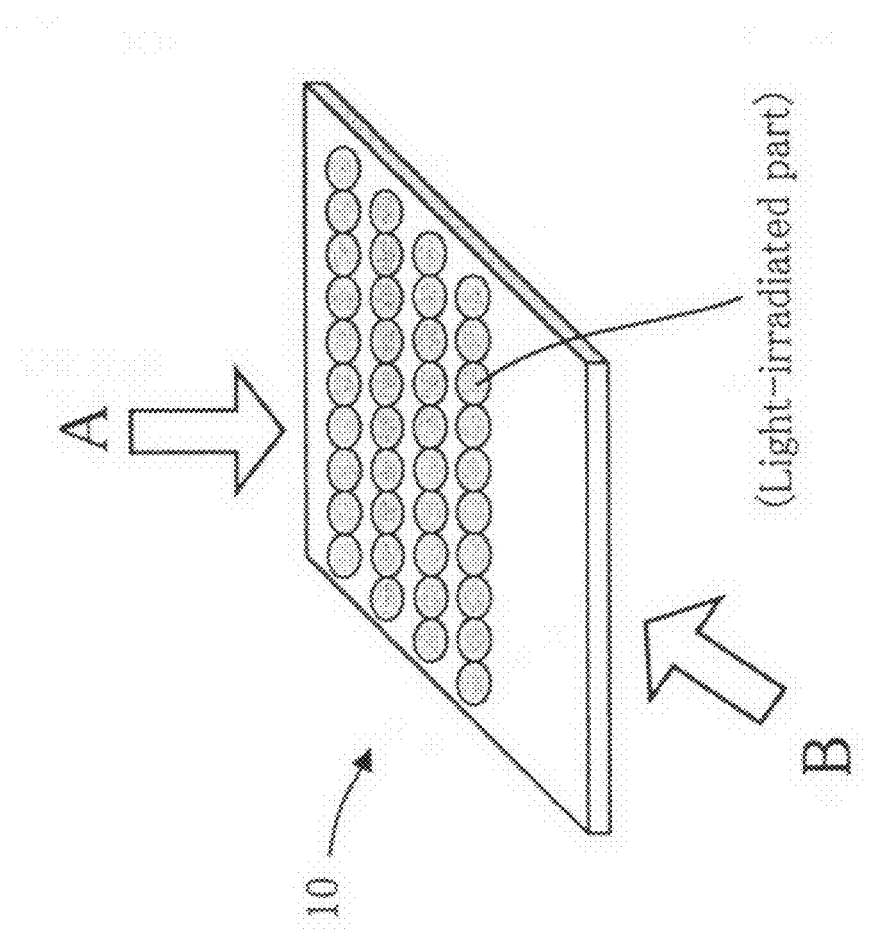
FIG. 2c is a diagrammatical view of FIG. 2b, showing a perspective view of an appearance of the structural body.
Figure 2E:
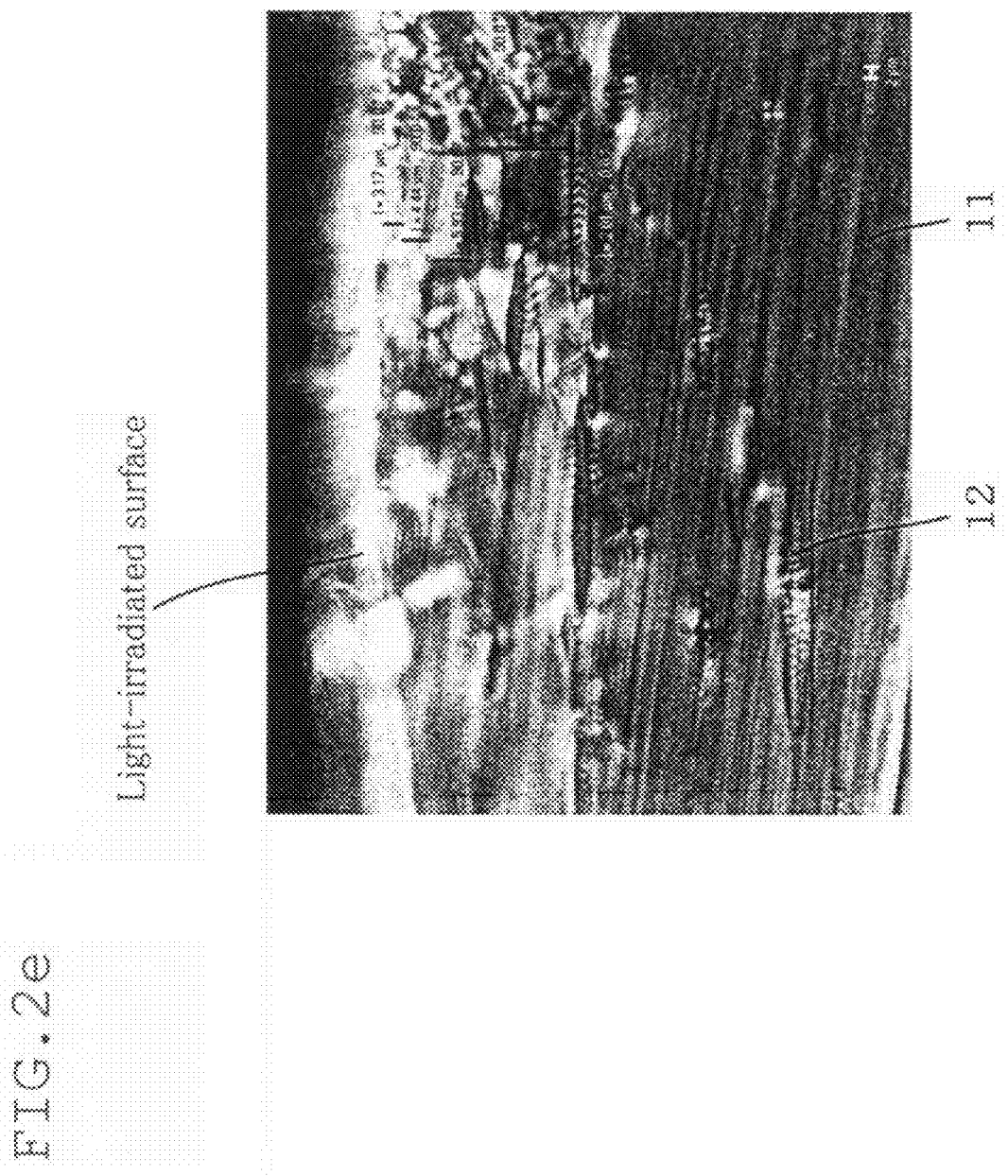
FIG. 2e is an enlarged microscopic image of a cavity when the structural body is viewed from side (direction B in FIG. 2c)

FIG. 1 is a cross-sectional view diagrammatically showing the structure of the structural body of this embodiment;

FIGS. 2a to 2e are views showing a cavity formed inside of the structural body, FIG. 2a is a diagrammatical view showing the cross section of the structural body in which a cavity is formed; FIG. 2b is a perspective view showing the appearance of the structural body in which a cavity is formed; FIG. 2c is a diagrammatical view of FIG. 2b, showing a perspective view of an appearance of the structural body; FIG. 2d is an enlarged microscopic image of a cavity when the structural body is viewed from top (direction A in FIG. 2c); and FIG. 2e is an enlarged microscopic image of a cavity when the structural body is viewed from side (direction B in FIG. 2c).

Figure 3A:
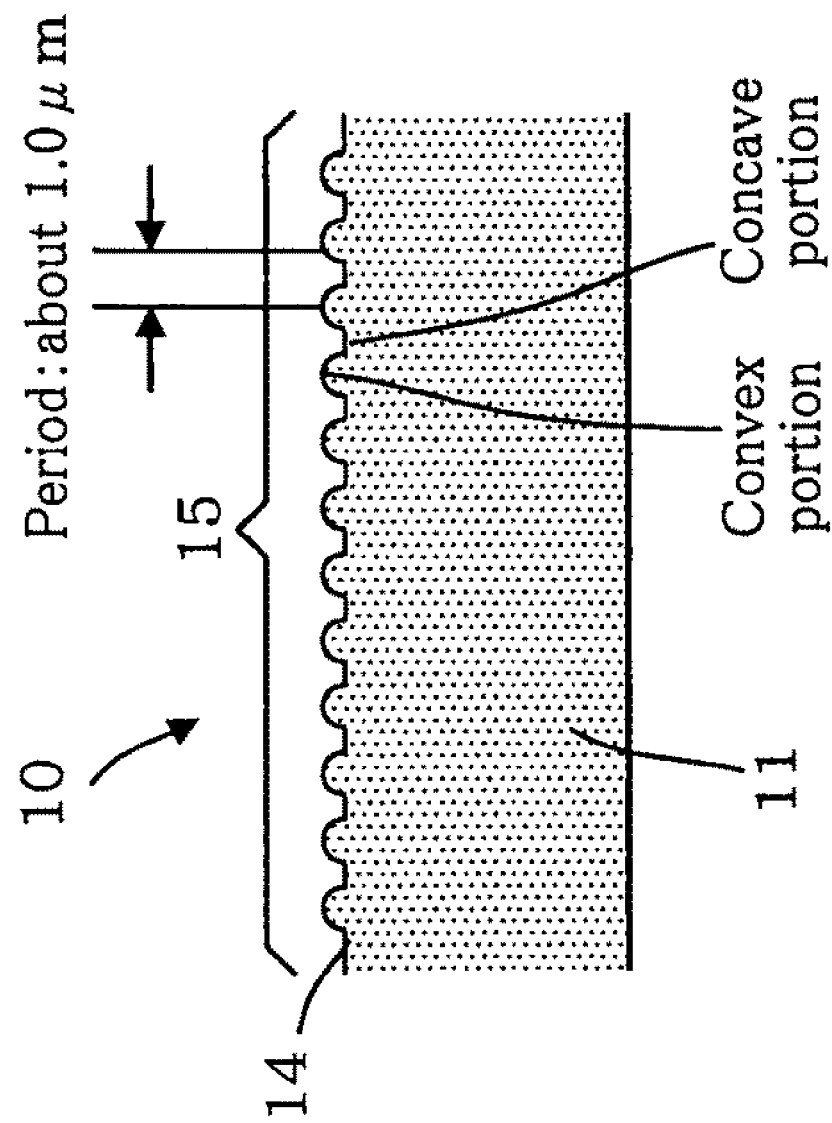
FIG. 3a is a diagrammatical view showing the cross section of the structural body in which a substrate surface periodic structure is formed.
Figure 3B:
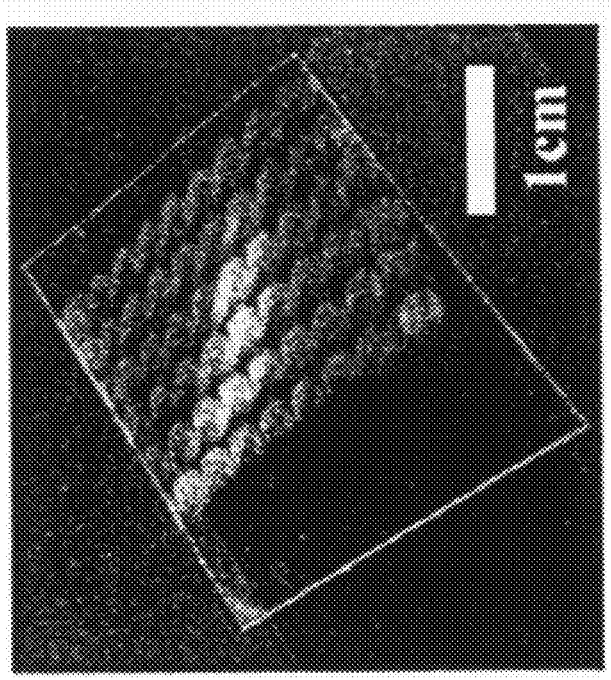
FIG. 3b is a perspective image showing the appearance of the structural body in which the substrate surface periodic structure is formed.
Figure 3C:
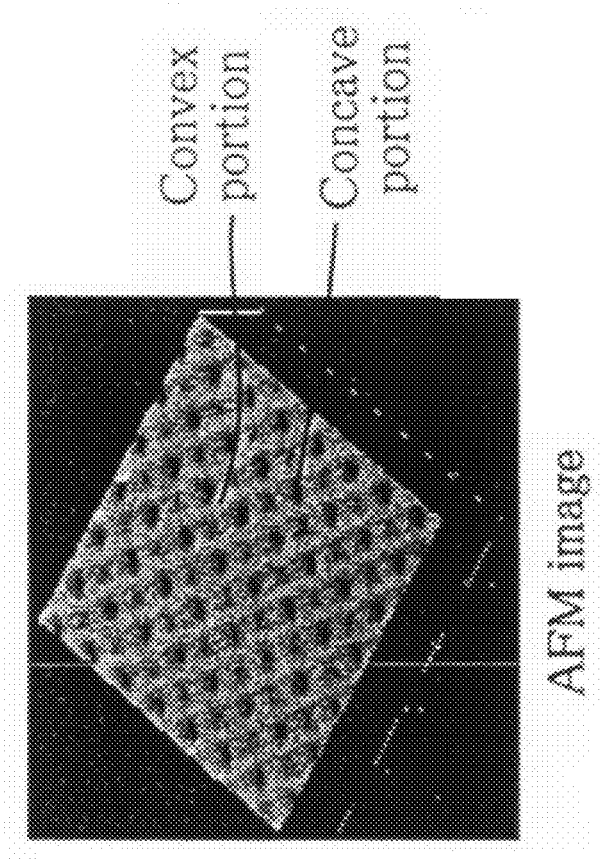
FIG. 3c is an AFM image showing an enlarged view of the substrate surface periodic structure.
Figure 4:
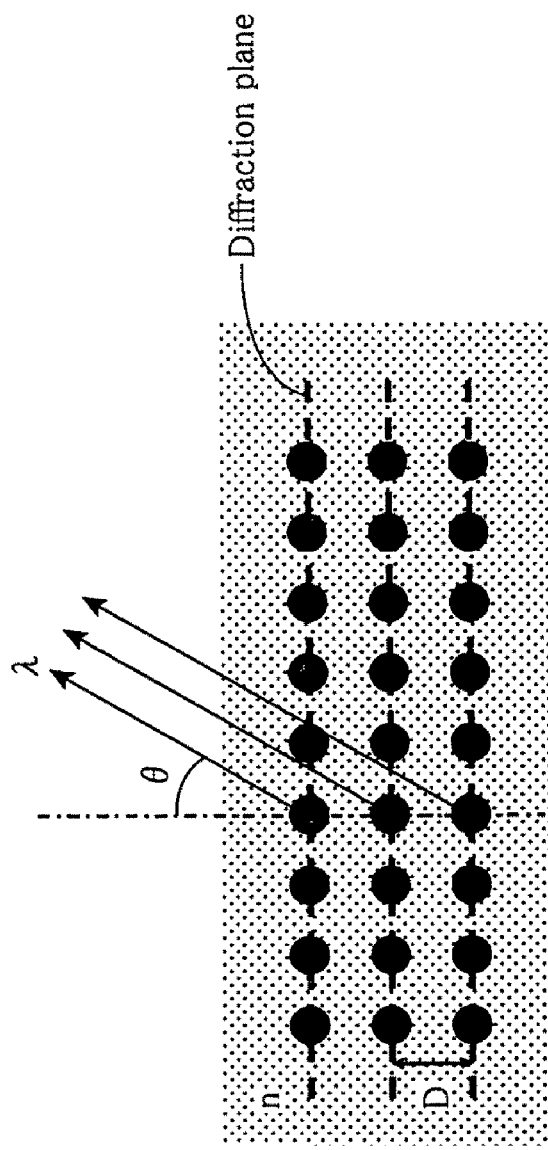
FIG. 4 is a view showing an arrangement of diffraction lattices for explaining the Bragg's law.

FIGS. 3a to 3c are views showing a periodic structure (substrate surface periodic structure) formed on the surface of the structural body (substrate surface), in which FIG. 3a is a diagrammatical view showing the cross section of the structural body in which the substrate surface periodic structure is formed; FIG. 3b is a perspective image showing the appearance of the structural body in which the substrate surface periodic structure is formed; and FIG. 3c is an AFM image showing an enlarged view of the substrate surface periodic structure.

(Cavity, Cavity Interface Periodic Structure)

As shown in FIG. 1 and FIGS. 2a to 2e, a cavity 12 is formed in the inside of a substrate 11 of a structural body 10.

As shown in FIG. 2a, each cavity 12 has almost a gong-like shape, and has a diameter of about 40 µm at longest.

As for the cavity 12, the diameter direction of the gong-like structure is almost in parallel with the plane direction of the structural body 10, and the thickness direction of the gong-like structure is almost in parallel with the thickness direction of the structural body 10.

As shown in FIG. 1 and FIGS. 2a to 2e, the periodic structure causing optical diffraction (cavity interface periodic structure 13) is formed in the interface of the cavity 12. The periodic structure 13 has a regular arrangement which develops a structural color.

Here, the "periodic structure" means a structure in which a plurality of predetermined shapes is formed at an almost equal interval. In the cavity interface periodic structure 13 of this embodiment, as shown in FIGS. 2a and 2d, in the interface of a single cavity 12, a plurality of convex portions and concave portions is formed vertically and laterally at almost equal intervals. This periodic structure 13 is formed over the entire surface of the cavity 12. Therefore, the cross section of the interface of the cavity 12 (cross section passing through the apex of the convex portion) has a wavy pattern, as shown in FIG. 2a. As apparent from the above, since the interval between the concave portion and convex portion in the interface of the cavity 12 is close to the wavelength of a visible light, a structural color is developed.

One period of the wavy pattern of the periodic structure 13 (the distance between the apices of two adjacent convex portions) is about 1.5 µm to 2.0 µm.

When light is incident on the periodic structure, diffraction occurs. At this time, a wavelength which is diffracted most strongly (a larger amount of photoenergy is diffracted) varies depending on the ratio between the wavelength and the lattice period. Generally, strong diffraction occurs when the ratio of the light wavelength to the lattice period is about 1 or less.

The "regular arrangement which develops a structural color" as referred to herein means that the lattice period is close to the wavelength of visible light (about 400 nm to 700 nm), i.e., about 2.0 µm or less. At this time, since visible light is diffracted strongly, a structural color is observed.

As shown in FIGS. 2b and 2c, the cavity 12 is formed at a light-irradiated part of the structural body 10.

A plurality of the cavity 12 is formed within the irradiated area (within the same plane).

These plural cavities 12 are formed at arbitrary positions laterally within the light-irradiated area. Furthermore, they are formed at different depths from the light-irradiated surface.

Here, each cavity 12, which is formed in the same plane at different depths from the surface, functions as a diffraction lattice. Depending on the light incident angle or the viewing angle, the structural body 10 develops different colors (when cavities 12 are present in the same plane, this plane is hereinafter referred to as the "diffraction plane").

If the diffraction plane presents at different depths, i.e. presents in a plurality of layers, diffraction occurs at each of the diffraction planes. At this time, emission is weak if the phase of the diffraction light from each diffraction plane is not uniform. If the phase of diffraction light from each diffraction plane is uniform, strong emission can be obtained. Specifically, strong emission can be obtained with light having a wavelength satisfying the following Bragg's reflection formula (formula 1):

$$m\lambda = 2D(n^2 - \sin 2\theta)^{1/2} \quad \text{formula 1}$$

In this formula 1, m is the order of diffraction, $\lambda$ is a wavelength, D is the interval of diffraction planes, n is the refractive index of a material and $\theta$ is a viewing angle assuming that the normal angle of the sample surface is 0°.

If the structural body 10, in which the diffraction planes are present at intervals satisfying the formula 1, can be formed, the structural body 10 develops a color only by light having a specific wavelength satisfying the formula 1. Furthermore, if the number of diffraction planes increases, stronger emission can be obtained due to an increase in the intensity of diffraction light.

As a material which develops a color according to the Bragg's Law, photonic crystals are known in which periodic structures are three-dimensionally formed.

The perspective image in FIG. 2b and the microscopic images in FIGS. 2d and 2e show the structural body 10 obtained by using a PET 3×3 elongated sheet. The raw material for the structural body 10 is, however, not limited thereto. Any material may be used insofar as the cavity 12 is formed in its inside by light irradiation.

(Substrate Surface Periodic Structure)

As shown in FIG. 1 and FIGS. 3a to 3c, in the surface of the substrate 11 of the structural body 10 (substrate surface 14), a periodic structure causing optical diffraction (substrate surface periodic structure 15) is formed. This periodic structure 15 has a regular arrangement developing a structural color. The "regular arrangement developing a structural color" as referred to herein mean a state in which the lattice period is close to the visible light wavelength (about 400 to 700 nm).

Here, the periodic structure is as defined above. In the substrate surface periodic structure 15 of this embodiment, as shown in FIGS. 3a and 3c, a plurality of concave and convex portions is formed at almost equal intervals on a substrate surface 14. This periodic structure 15 is formed on the entire substrate surface 14. Therefore, the cross section of the substrate surface 14 (cross section passing through the apices of the convex portions) has a wavy pattern as shown in FIG. 3a. A structural color is developed since the interval between convex portions is close to a visible light wavelength.

One period of the wavy pattern of the substrate periodic structure 15 (distance between the apices of adjacent convex portions) is about 1.0 μm.

The substrate surface periodic structure 15 is formed at a light-irradiated portion of the substrate surface 14. Therefore, as shown in FIG. 3b, in order to form a periodic structure over the entire surface of the substrate surface 14, it is preferred that a plurality of portions of the substrate surface 14 be irradiated with light such that no gaps are made depending on the area of the substrate surface 14.

The images of FIGS. 3b and 3c show the structural body 10 obtained by using a PET 3×3 elongated sheet. The raw material of the structural body 10 is, however, not limited thereto. Any material may be used insofar as the substrate surface periodic structure 15 is formed in its inside by light irradiation.

As mentioned above, the structural body 10 of this embodiment has a configuration in which the cavity 12 with a fine periodic structure being formed in the interface thereof is formed within the substrate 11, and the substrate surface 14 has a fine periodic structure. By allowing a structural color to be developed from the periodic structures 13 and 15 by an optical phenomenon such as diffraction and interference, whereby a marking is formed.

Here, the "marking" is defined by an area where portions which develop a structural color and/or diffraction light are uniformly formed, or a graphic, a letter or the like which is formed as a result of adequate arrangement of portions which develop a structural color and/or diffraction light.

By forming the cavity interface periodic structure 13 and the substrate surface periodic structure 15 in the substrate itself, it is impossible to remove them for reuse purposes, such as attaching to other objects. Also, it is impossible to delete or alter the periodic structures 13 and 15.

(Substrate)

The substrate 11 is an element which serves as the base of the structural body 10.

In the substrate 11, high-molecular compounds such as polystyrene, polyethylene, polypropylene, polycarbonate, nylon resins, acrylic resins, vinyl chloride resins and phenol resins, optical glass such as BK7 and quartz and soda glass may be used as raw materials. It is also possible to use polyester compounds such as polyethylene terephthalate (PET), polyethylene naphthalate (PEN), polybutylene terephthalate (PBT) and polytrimethylene terephthalate (PTT) as raw materials.

The raw materials for the substrate 11 are not limited to the materials mentioned above, and suitable known materials may also be used insofar as the materials can allow the cavity 12, the cavity interface periodic structure 13 and the substrate surface periodic structure 15 to be formed by light irradiation.

(Protective Layer)

Figure 5:
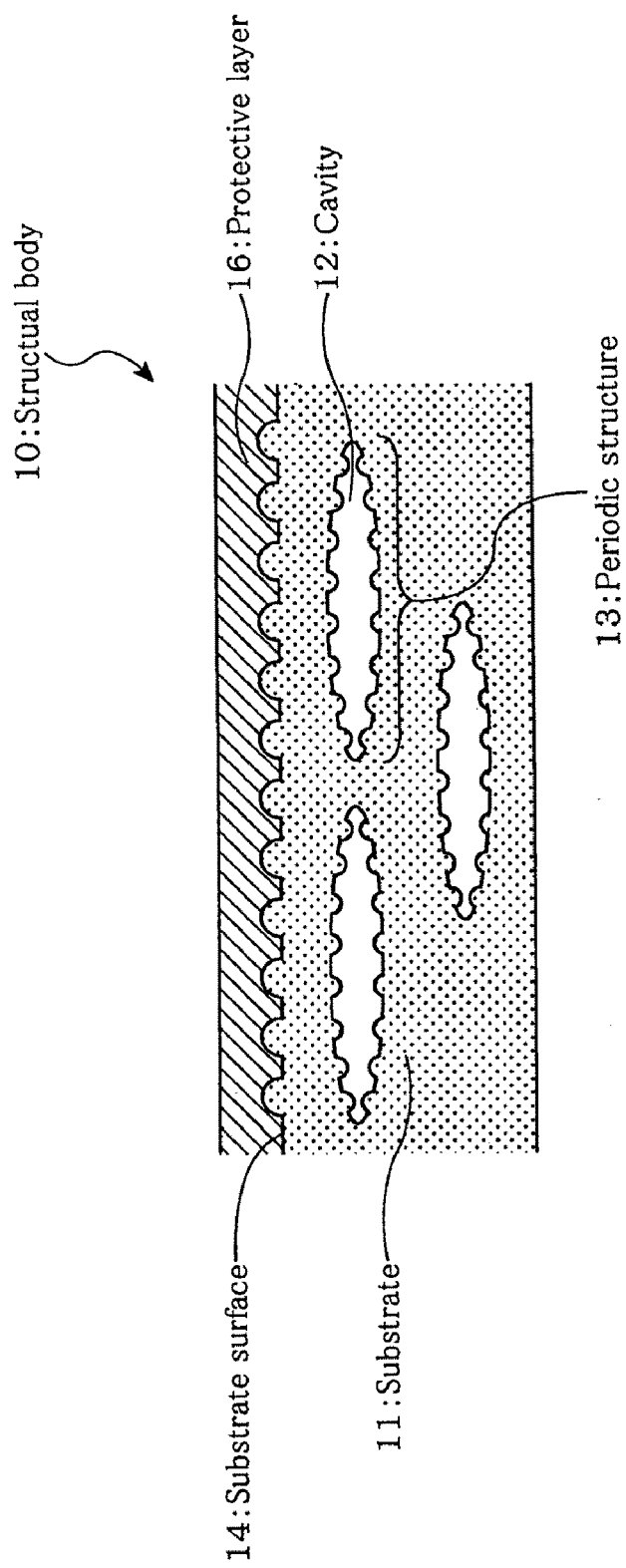
FIG. 5 is a cross sectional view diagrammatically showing other configuration of the structural body of this embodiment.

As shown in FIG. 5, a protective layer 16 may be provided in the structural body 10.

The protective layer 16 is a protective film to avoid such an unfavorable phenomenon that the substrate surface periodic structure 15 is damaged to become unable to develop a structural color.

The protective layer 16 may be formed of acrylamino, polyesteramino, polyesteracrylamino or the like, for example.

[Apparatus for Forming a Structural Body]

Next, an explanation is made on an apparatus for forming a structural body. There are two types of apparatuses for forming a structural body, i.e. one which has a transmitting diffraction optical device and one which has a micro-lens array.

(Apparatus for Forming a Structural Body Using a Transmitting Diffraction Optical Device)

First, with reference to FIGS. 6 to 8, an explanation will be made on an apparatus for forming a structural body utilizing a transmitting diffraction optical device.

Figure 6:
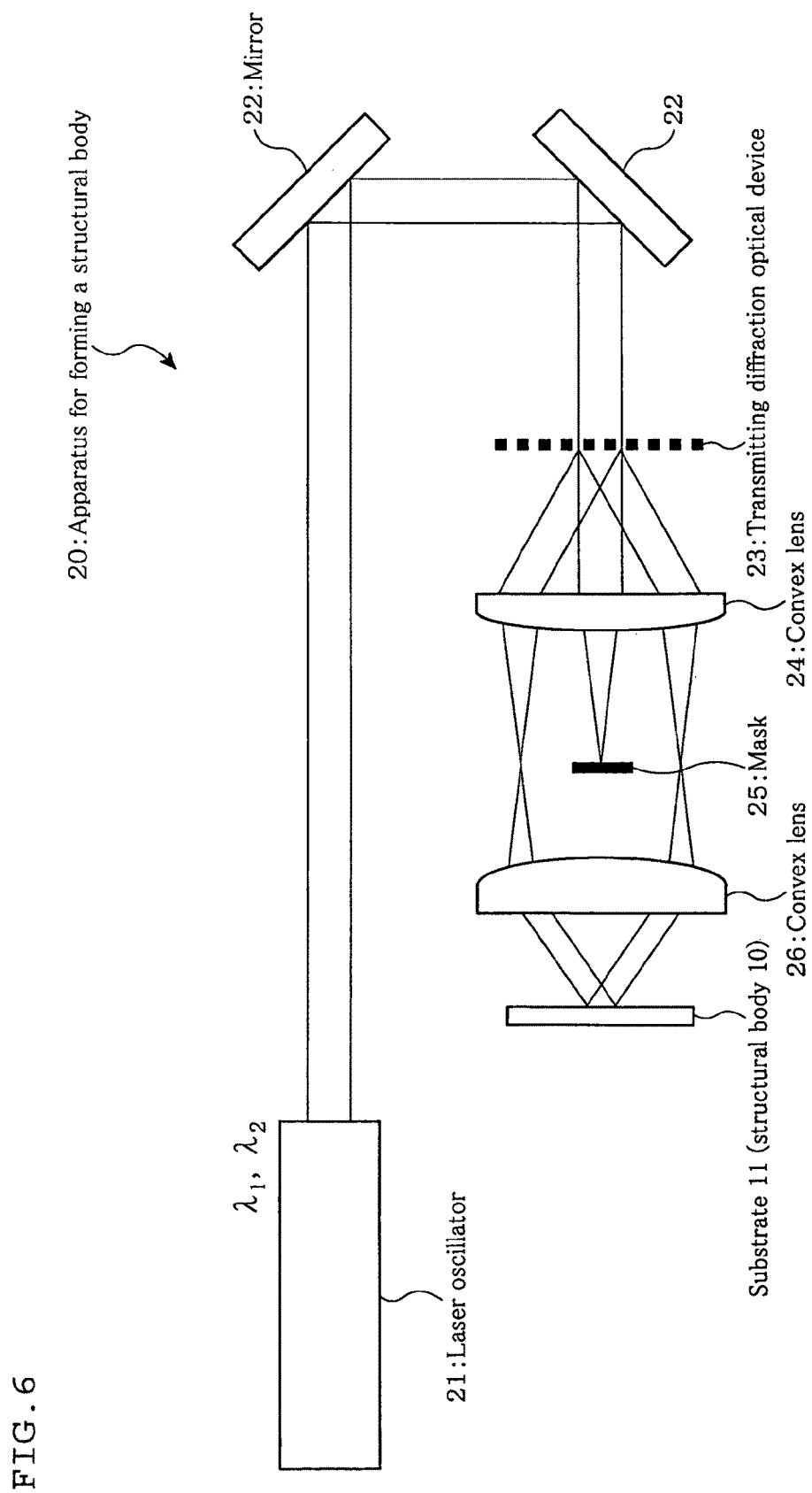
FIG. 6 is a schematic view showing the configuration of an apparatus for forming a structural body using a transmitting diffraction optical device.
Figure 7:
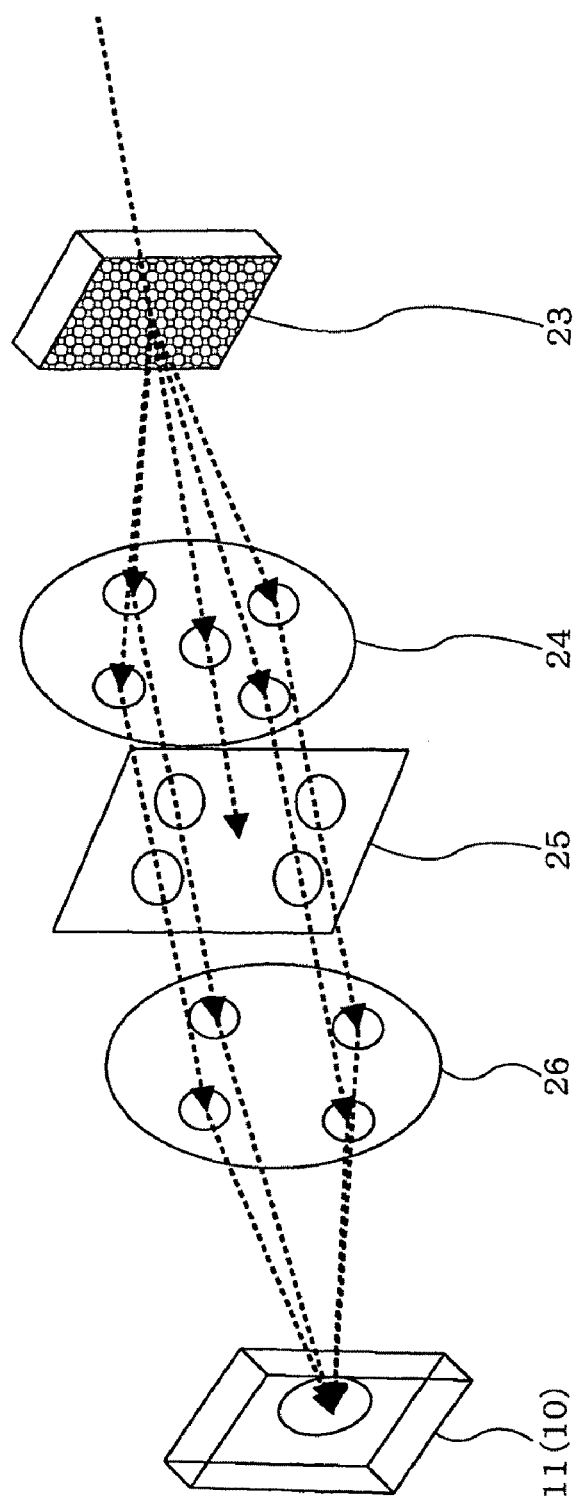
FIG. 7 is a diagrammatical perspective view showing the configuration of an optical interference system of an apparatus for forming a structural body using a transmitting diffraction optical device.
Figure 8:
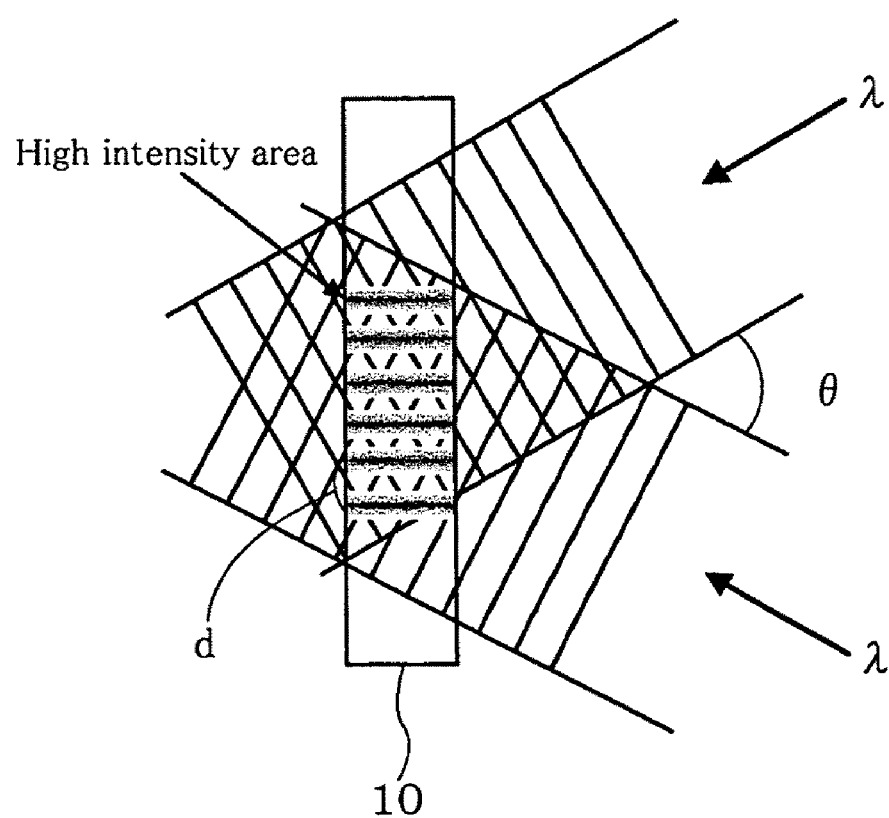
FIG. 8 is a view showing an interference area of light to be irradiated to the substrate.

FIG. 6 is a schematic view showing a structure of the apparatus for forming the structural body, FIG. 7 is a diagrammatical perspective view showing a constitution of an interference optical system of the apparatus for forming the structural body, and FIG. 8 is a view showing the manner in which light beams intersect and interfere around the substrate (structural body) to form a high intensity area.

The apparatus for forming the structural body 20 is an apparatus for forming the cavity interface periodic structure 13 or the substrate surface periodic structure 15 in the substrate 11 (structural body 10). As shown in FIGS. 6 and 7, the apparatus is provided with a laser oscillator 21, a mirror 22, a transmitting diffraction optical device 23, a convex lens 24, a mask 25 and a concave lens 26.

Here, the laser oscillator 21 is an apparatus which outputs a laser beam. Examples include a YAG laser which performs Q-switch oscillation, a $YVO_4$ laser, a YLF laser and a femtosecond laser such as a Ti:sapphire laser. These pulse lasers have repeated frequency of several Hz to several tens of kHz. The energy accumulated during these repeated periods is released at an extremely short time interval such as several femtoseconds to several tens of nanoseconds. Therefore, a high peak power can be obtained efficiently from a small amount of input energy.

To form the periodic structure 13 in the inside of the substrate 11, 5 to 20 laser shots will suffice. Such laser shots require about several seconds, realizing high-speed production. As a result, products developing a structural color can be produced at a low cost. In addition, a further shortening of production time can be attained by using a light source having a high repeated frequency.

The laser oscillator 21 has a function of adjusting the irradiation pulse number. The laser oscillator 21 can control the energy density (fluence: energy per area irradiated with one pulse) by adjusting the outputs of the laser.

Control of the energy density can be realized not only by adjusting the laser output of the laser oscillator 21 but also by changing the laser beam diameter with the laser output being the same.

To allow the periodic structure to be formed in the inside of the irradiated material, it is required that the irradiation light be penetrated into the inside of the material. To prevent the irradiation light from being absorbed on the polar surface, it is desirable to use light with a wavelength exhibiting an appropriate transmittance at the irradiated material.

A mirror 22 reflects laser light which has been output from the laser oscillator 21. In FIG. 6, two mirrors 22 are provided. The number of the mirror 22 is, however, not limited to two, and an arbitrary number of mirrors may be provided.

The transmitting diffraction optical device 23 is a transmitting optical device which causes diffraction since fine convex and concave portions are periodically formed on the surface thereof, and divides laser light into a plurality of light beams.

As the convex lens 24, a synthetic quartz flat convex lens having a focal distance of 200 mm can be used, for example. In this case, the convex lens 24 is placed at a position 200 mm away from the transmitting diffraction optical device 23. The convex lens 24 allows the plurality of light beams which have been divided by the transmitting diffraction optical device 23 to pass therethrough.

The mask 25 is placed at a position at which the light beams which have been passed through the convex lens 24 focus, and hides light beams which are not required for interference but passes through light beams which are required for interference.

As the convex lens 26, a synthetic quartz flat convex lens having a focal distance of 100 mm can be used, for example. The convex lens 26 condenses light beams which have passed through the mask 25, and causes the light beams to intersect and interfere. The interference region has a high intensity distribution, as shown in FIG. 8. The substrate 11 is irradiated with this region.

Here, the period d of the interference fringe can be expressed by the following formula:

$$d=\lambda/(2\sin(\theta/2)) \quad \text{formula 2}$$

λ: light wavelength, θ: intersecting angle of light beam

As for the relationship between the division of the laser beam by means of the transmitting diffraction optical device 23 and the selection of the laser beam by means of the mask 25, an explanation will be made in the "Method for forming a periodic structural pattern by using a transmitting diffraction optical device" in the "Method for forming a periodic structural pattern", which is given later.

(Apparatus for Forming a Structural Body by Using a Micro-Lens Array)

Next, an apparatus for forming a structural body will be explained with reference to FIGS. 9 and 10.

Figure 9:
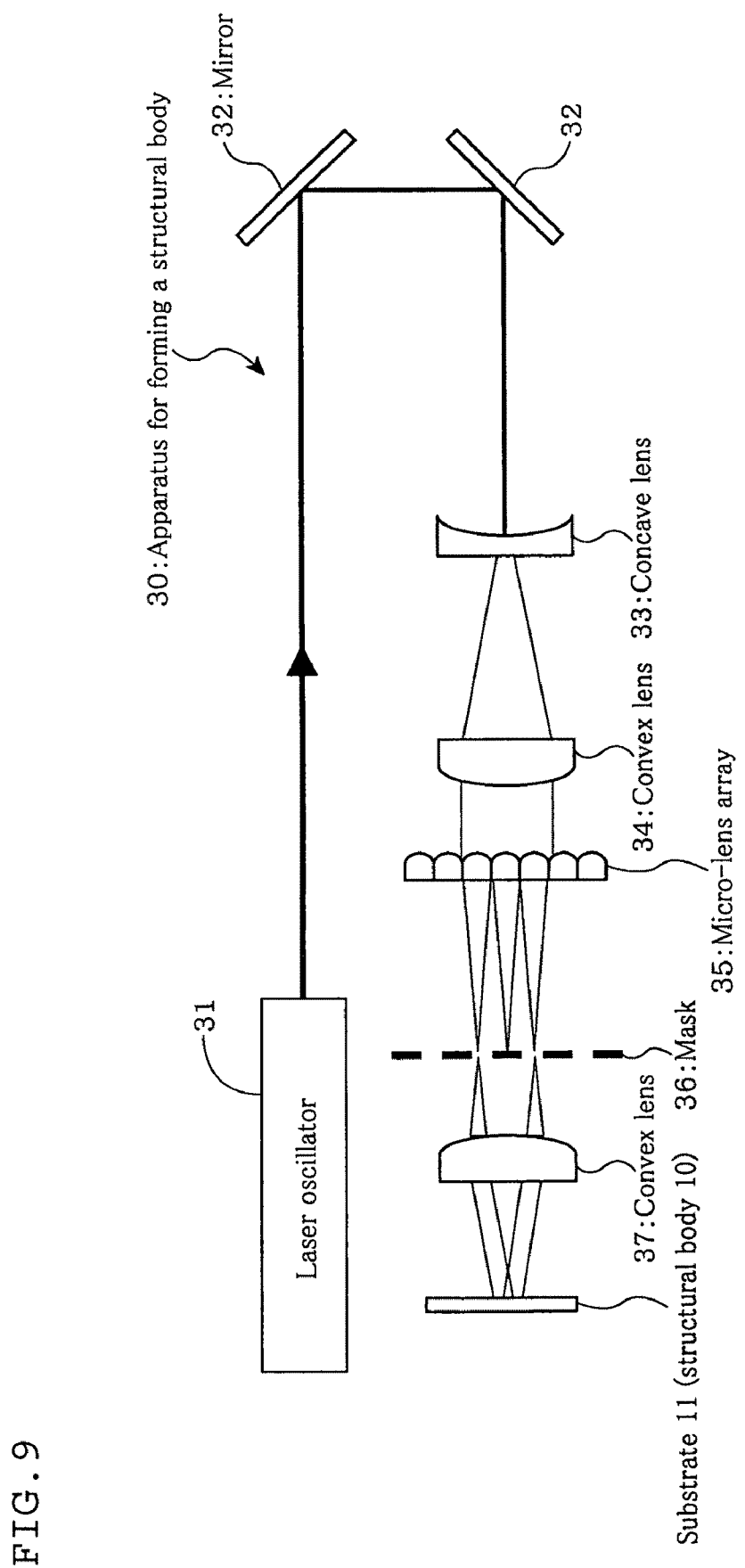
FIG. 9 is a schematic view of an apparatus for forming a structural body using a micro-lens array.

FIG. 9 is a schematic view explaining a configuration of the apparatus for forming a structural body. FIG. 10 is a diagrammatic perspective view of the optical interference system of the apparatus for forming a structural body.

Figure 10:
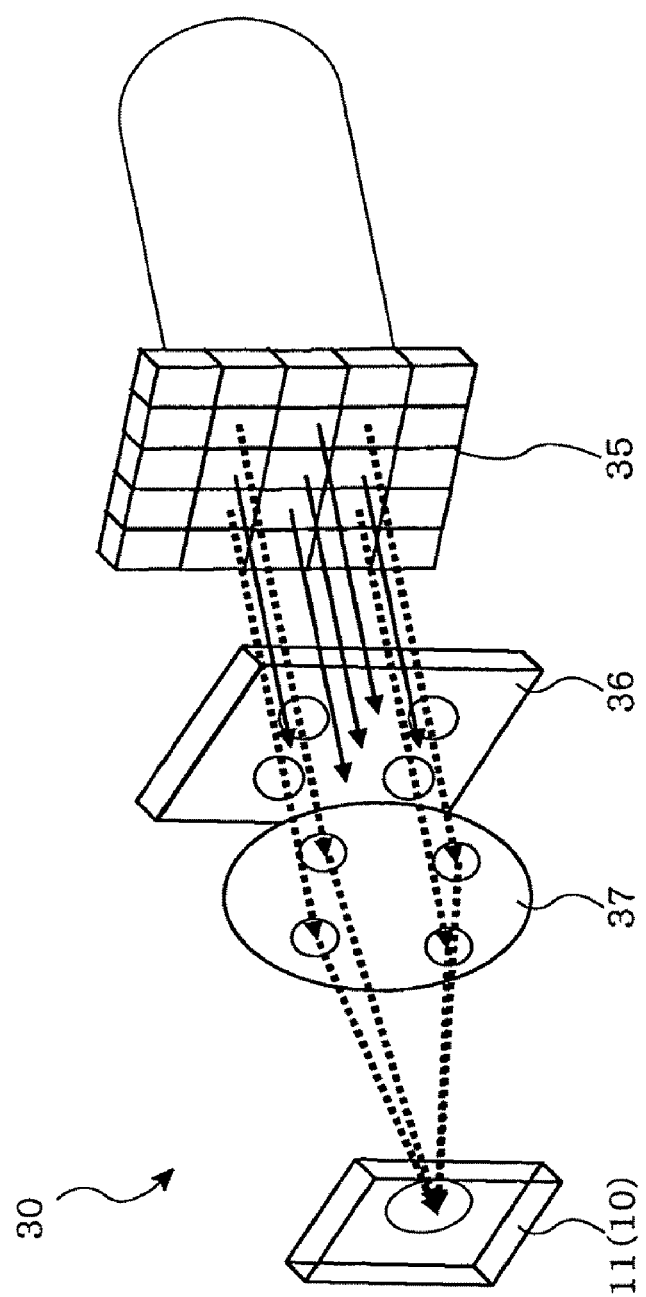
FIG. 10 is a diagrammatical perspective view showing the configuration of an optical interference system of the apparatus for forming a structural body using a micro-lens array.

As shown in FIGS. 9 and 10, the apparatus for forming the structural body 30 has a laser oscillator 31, a mirror 32, a concave lens 33, a convex lens 34, a micro-lens array 35, a mask 36 and a convex lens 37.

Here, the laser oscillator 31 has the same function as that of the laser oscillator 21 of the apparatus 20 for forming a structural body shown in FIG. 6.

The mirror 32 reflects laser light which has been output from the laser oscillator 31. In FIG. 9, two mirrors 32 are provided. The number of the mirror 32 is, however, not limited to two, and an arbitrary number of mirrors may be provided.

The concave lens 33 enlarges the diameter of the laser beam. The convex lens 34 adjusts the enlarged laser beam diameter to a desired diameter.

The micro-lens array 35 is an optical device in which fine convex lenses are arranged in a checkerboard pattern, and divides the laser light into a plurality of beams.

The mask 36 selects some of the divided light beams. The convex lens 37 collects light beams which have been selected by the mask 36.

As for the relationship between the division of the laser beam by means of the micro-lens array 35 and the selection of the laser beam by means of the mask 36, an explanation will be given in the "Method for forming a periodic structural pattern by using a transmitting diffraction optical device" in the "Method for forming a periodic structural pattern by using a micro-lens array", which is given later.

[Method for Forming a Structural Body]

Next, an explanation will be made on the method for forming the structural body of this embodiment with reference to FIGS. 11 and 12.

Figure 11:
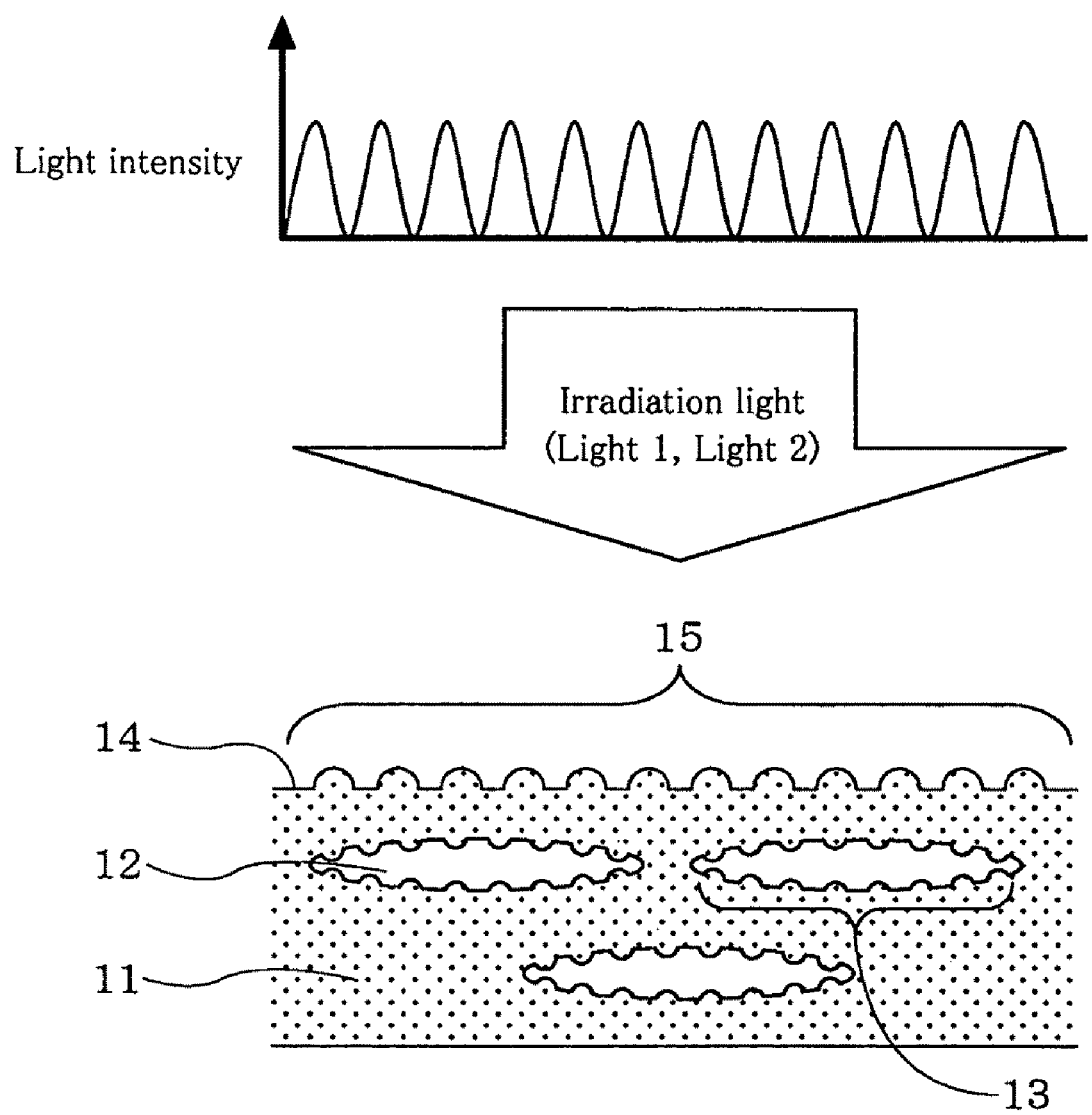
FIG. 11 is a view showing light irradiation at a periodic light intensity distribution.

FIG. 11 is a view showing the substrate being irradiated with light having a periodic intensity distribution. FIG. 12 is a view showing the relationship between the wavelength of light to be irradiated and the periodic structure formed by this irradiation.

As shown in FIG. 11, by irradiating the substrate 11 with light 1 having a periodic intensity strength distribution, the cavity 12 having the periodic structure 13 in the interface thereof is formed in the inside of the substrate 11. At this time, the fine periodic structure 13 is formed with the same period as that of the periodic intensity distribution.

On the other hand, by irradiating the substrate 11 with light 2 which has a periodic intensity distribution, the periodic structure 15 is formed on the substrate surface 14. At this time, the fine periodic structure 15 is formed with the same period as that of the periodic intensity distribution.

Here, the light 1 is light having a wavelength within a wavelength region which allows the substrate 11 to show transparency. The light 2 is light having a wavelength within a wavelength region which allows the substrate 11 to show opacity. This means that, in the method for forming the structural body 10, dependency of the optical characteristics of the substrate 11 on the light wavelength is utilized.

For light with a specific wavelength, the substrate 11 has any of the following properties: transparency with a transmittance of 70% or more, semi-transparency with a transmittance of less than 70%, and opacity with a transmittance of less than 10%. When the substrate 11 shows transparency for a certain wavelength, the light penetrates into the inside of the substrate. If the substrate 11 shows opacity for a certain wavelength, the light enters only in the proximity of the surface of the substrate.

Figure 12:
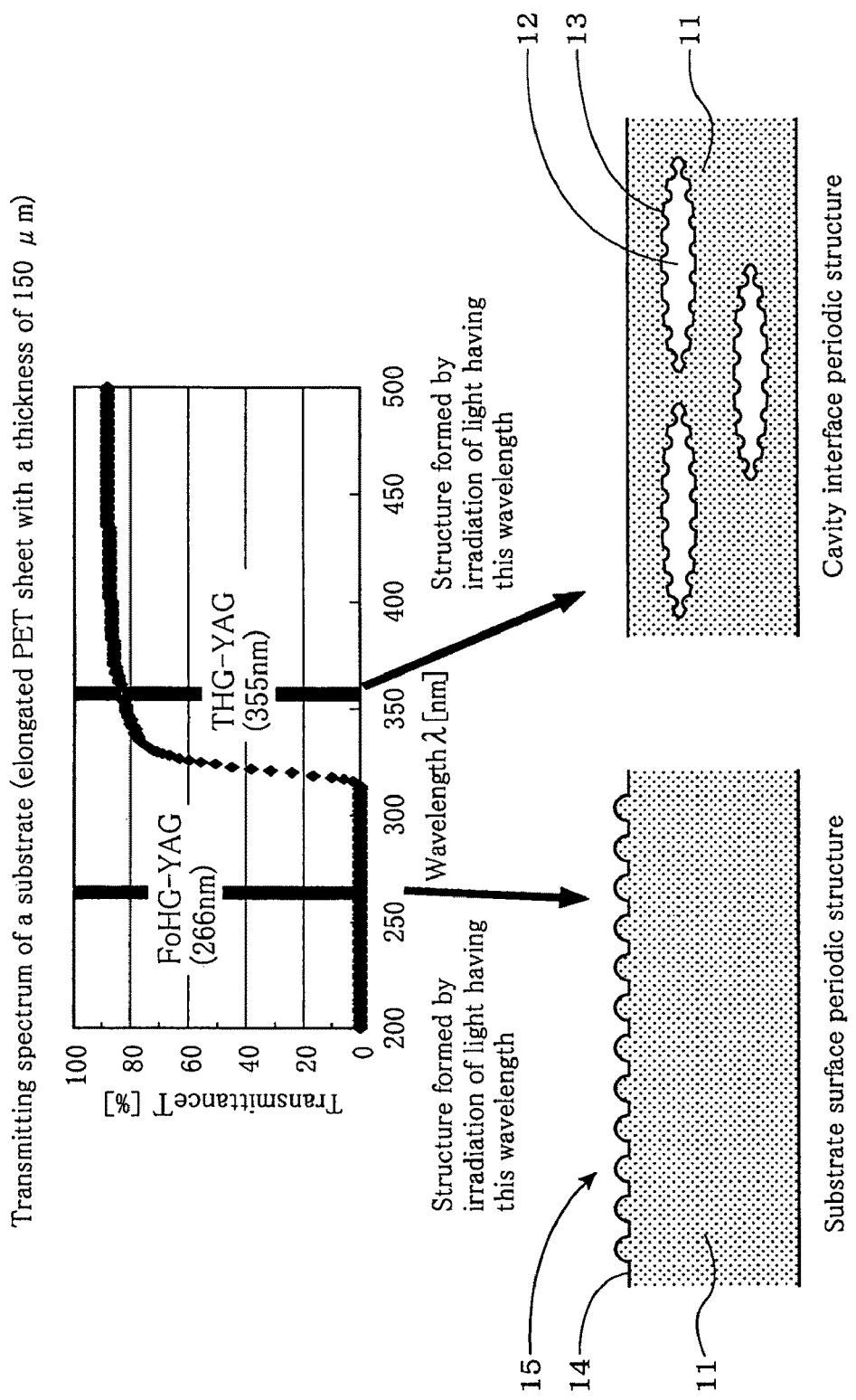
FIG. 12 is a view showing a transmission spectrum of the substrate and a periodic structure formed by the irradiation of light having a specific wavelength.

Specifically, as shown in FIG. 12, the substrate 11 is irradiated with light having a wavelength of about 330 nm or more (355 nm, for example), which is the light within a wavelength region allowing the substrate 11 to show transparency, whereby the cavity 12 and the cavity interface periodic structure 13 are formed. The substrate 11 is irradiated with light having a wavelength of about 310 nm or less (266 nm, for example), which is the light having a wavelength within a wavelength region allowing the substrate 11 to show opacity, whereby the substrate surface periodic structure 15 is formed.

There is no specific order of irradiation between the light having a wavelength within a wavelength region which allows the substrate 11 to show transparency and the light having a wavelength within a wavelength region which allows the substrate 11 to show opacity. However, it is preferred that the substrate 11 be irradiated with the light having a wavelength within a wavelength region which allows the substrate 11 to show transparency at first, followed by the irradiation with the light having a wavelength within a wavelength region which allows the substrate 11 to show opacity.

The reason for this is to prevent the following unfavorable phenomenon from occurring. Specifically, if the substrate surface periodic structure 15 has been formed in advance, the periodic optical intensity distribution is disarranged when forming the cavity interface periodic structure 13. As a result, a well-arranged periodic structure is not formed, and development of a structural color is deteriorated.

Irradiation of light having a periodic intensity distribution can be performed by the irradiation of parallel rays by means of a mask with periodically arranged openings or by the irradiation of the interference region obtained by intersecting a plurality of parallel rays.

Generally, a single pulse laser shot will suffice to form the cavity interface periodic structure 13. About 5 to 20 pulse laser shots will suffice to form the substrate surface periodic structure 15. This takes only several seconds. In addition, by using a laser light source having a large pulse repetition frequency, a further shortening of time can be realized.

As the substrate surface periodic structure, LIPS (Laser Induced Periodic Structures) may be given other than those mentioned above.

This is a fine periodic structure formed in a self-organized manner by spontaneously generating a periodic intensity distribution on the surface of a material by laser irradiation. In addition, it is also possible to use a hot stamp method in which a pattern having a periodic structure is pushed to the substrate after heating or a pattern having a periodic structure is pushed to the heated substrate.

The above-mentioned LIPS are disclosed in the following Non-Patent Document.

Non-Patent Document: Sylvain Lazare: "Large scale excimer laser production of submicron periodic structures on polymer surface", Applied Surface Science 69 (1993), pages 31 to 37, North Holland The periodic light intensity distribution for forming the cavity 12 or the cavity interface periodic structure 13 can be formed by the following three methods, for example.

Figure 13:
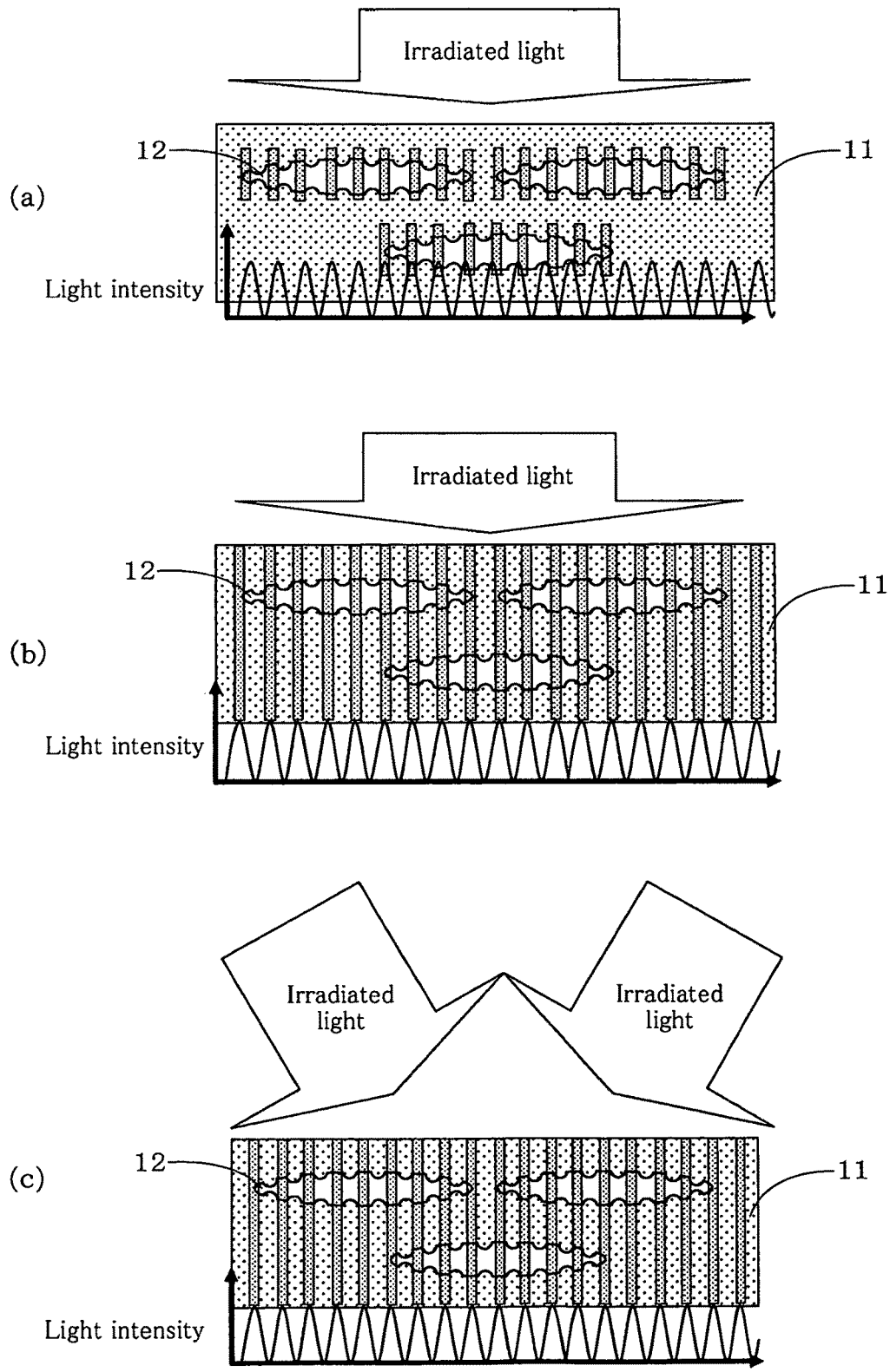
FIG. 13 is a view showing a method for generating a periodic light intensity distribution, in which (a) is a view showing a method for forming a periodic light intensity distribution by the interference of incident light and light reflected by the interface; (b) is a view showing a method for irradiating a monobeam of light having a periodic light intensity distribution; and (c) is a view showing a method for generating a periodic light intensity distribution by the interference of a polybeam.

As the first method, as shown in FIG. 13(*a*), a periodic light intensity distribution is generated by the interference of incident light and light reflected at the interface.

As the second method, as shown in FIG. 13(*b*), a periodic light intensity distribution is generated by the irradiation of a single beam having a periodic light intensity distribution.

As the third method, as shown in FIG. 13(*c*), a periodic light intensity distribution is generated by the interference of multiple beams.

The above-mentioned irradiation of light having a periodic intensity distribution can be formed by the irradiation of parallel rays through a mask having periodically-arranged openings or by the irradiation of an interference area obtained by intersecting a plurality of light beams.

[Method for Forming a Periodic Structural Pattern]

The method for forming a periodic structural pattern when the transmitting diffraction optical device or the micro-lens array is functioned as an optical control device is explained with reference to FIGS. 14 and 15.

When light is incident on the periodic structure, diffraction light appears in the direction of periodicity.

The optical control device is defined as a device which controls the pattern (direction, angle and wavelength) of diffraction light. This control is performed by adjusting the pattern (the number of the axis of periodicity, the angle of periodicity and the periodicity of lattice) of the periodic structure. As a result, optical information (diffraction pattern) can be recorded as a sort of bar code utilizing diffraction.

The pattern of the periodic structure of the structural body is the same as that of the periodic intensity distribution of light to be irradiated. That is, by using different periodic intensity distribution patterns, it is possible to create various patterns of periodic structures.

The pattern of the periodic intensity distribution can be changed by changing the position of an opening, if parallel rays are irradiated through a mask having an opening. The pattern of the periodic intensity distribution can be changed by changing the number, intersecting direction, intersecting angle and wavelength of light beams if irradiating with an interference area which is obtained by intersecting a plurality of light beams.

In the former method, of the parallel rays incident on the mask, only light near the openings passes through the mask. The light then advances straightforwardly, and is incident on an object. Therefore, the pattern of the periodic intensity distribution coincides with the arrangement of the mask openings.

In the case where irradiation is performed with an interference area, as the method for obtaining a plurality of beams by dividing a single beam, two methods are available; i.e. the use of a transmitting diffraction optical device and the use of a micro-lens array.

Each of these methods is explained below.
(Method for Forming a Periodic Structural Pattern by Using a Transmitting Diffraction Optical Device)

When a transmitting diffraction optical device is used, a laser beam is incident on a transmitting diffraction optical device. The incident laser beam is divided into two beams, i.e. a beam which advances straightforwardly and a beam which diffracts. The light beam to be diffracted appears in the direction of periodicity.

Figure 14:
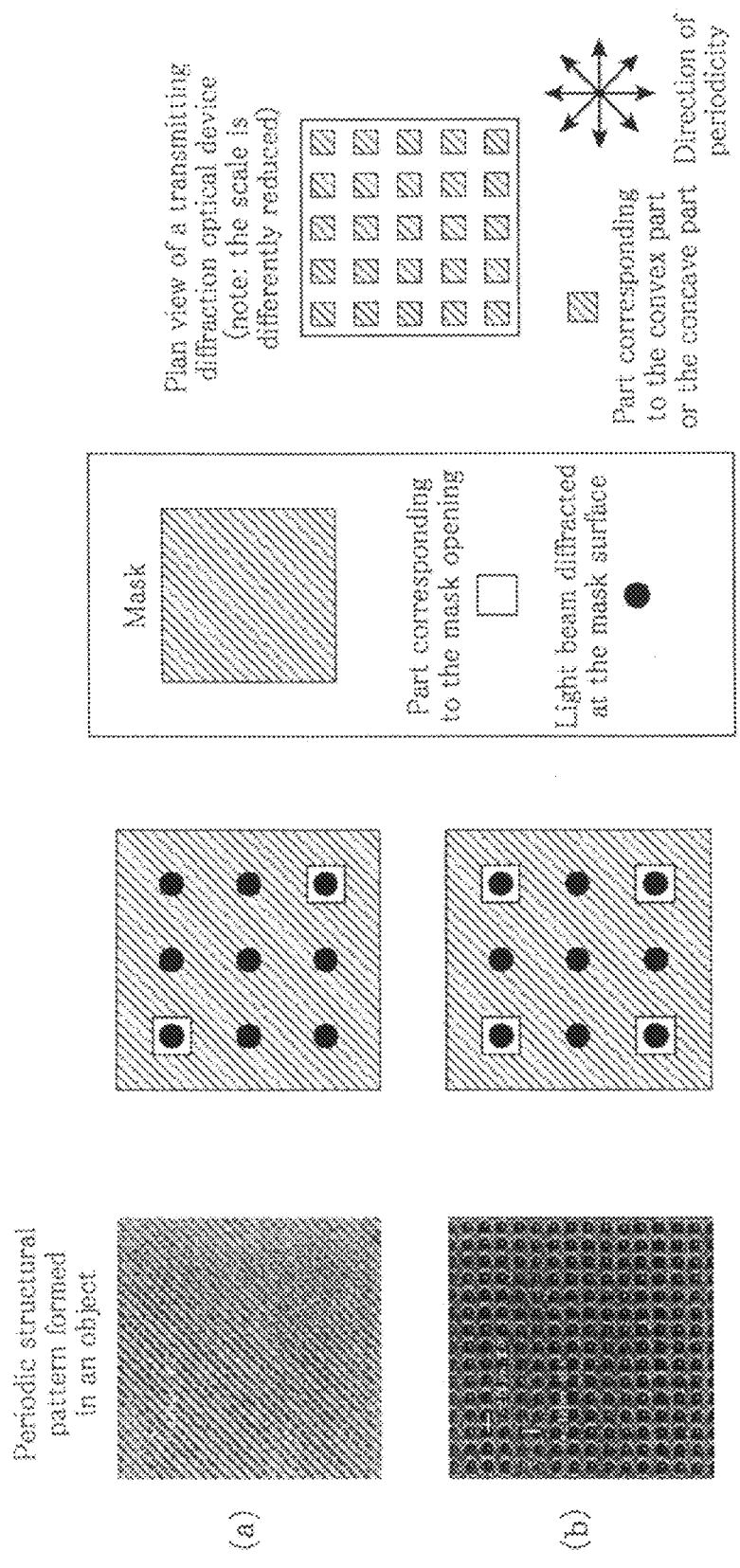
FIG. 14 is a view showing a method for forming a periodic structural pattern when a transmitting diffraction optical device is used.

From the relationship between the division of the light beam by the transmitting diffraction optical device and the opening of the mask, the pattern of the periodic structure shown in FIGS. 14(*a*) and (*b*) can be obtained.

Here, as shown in FIG. 14(*a*), the laser light is divided into 3×3 laser beams. Of these, if a pair of laser beams which are positioned diagonally pass in correspondence with the opening of the mask, a slanted striped periodic structural pattern is formed.

As shown in FIG. 14(*b*), if two pairs of laser beams positioned diagonally pass in correspondence with the opening of the mask, a dot-like periodic structural pattern is formed.

As is apparent from the above, the periodic structural pattern varies depending on the combination of the light-dividing pattern of the transmitting diffraction optical device and the pattern of mask openings. As a result, optical information can be recorded as a sort of barcode utilizing diffraction.
(Method for Forming a Periodic Structural Pattern by Using a Micro-Lens Array)

The method using a micro-lens array is a method which can be compared to gelidium jelly (tokoroten)-making. Specifically, a laser beam is allowed to be incident on the micro-lens array as in the case where the gelidium jelly is pushed out by means of a gelidium jelly-making instrument. As a result, the laser light is divided into a plurality of laser beams in a checkerboard pattern.

Figure 15:
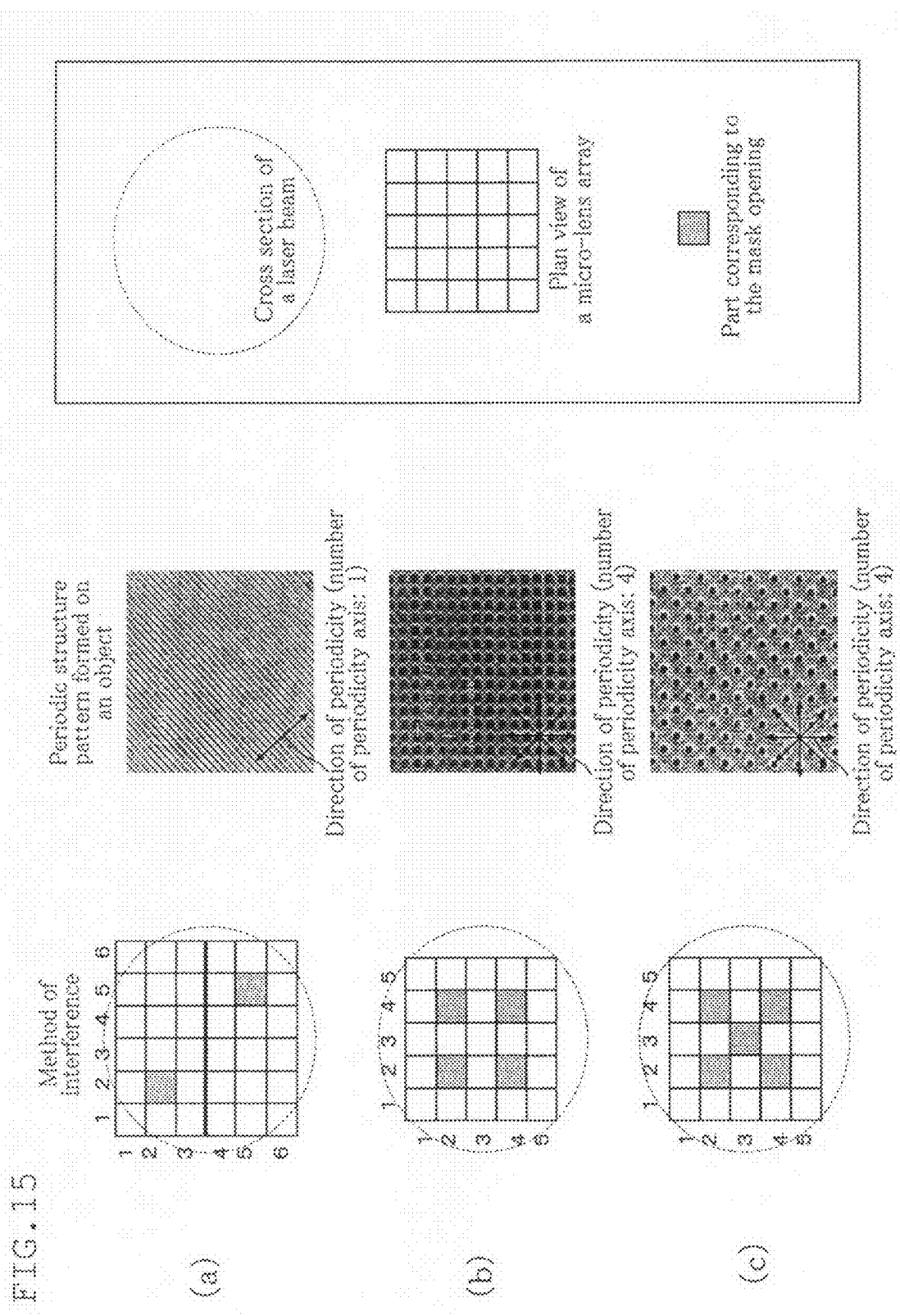
FIG. 15 is a view showing a method for forming a periodic structural pattern when a micro lens-array is used.

For example, from the relationship between the division of the light beam by the micro-lens and the mask opening, the periodic structural pattern to be recorded as the cavity interface periodic structure 13 or the substrate surface periodic structure 15 is as shown in FIGS. 15(*a*) to (*c*).

Here, as shown in FIG. 15(*a*), the laser light is divided into 36 (6×6) laser beams. Of these, if the laser beam positioned at the intersection of column 2 and row 2 and the laser beam positioned at the intersection of column 5 and row 5 pass in correspondence with the mask opening, a periodic structural pattern with an oblique striped pattern is recorded. At this time, the number of the axis of periodicity is 1, and the direction of periodicity is in perpendicular to the direction in which one of the stripes extends.

Furthermore, as shown in FIG. 15(*b*), the laser light is divided into 25 (5×5) laser beams by the micro-lens array. Of these, if the laser beam positioned at the intersection of column 2 and row 2, the laser beam positioned at the intersection of column 2 and row 4, the laser beam positioned at the intersection of column 4 and row 2 and the laser beam positioned at the intersection of column 4 and row 4, respectively, pass in correspondence with the mask opening, a fine dot periodic structural pattern is recorded. At this time, the number of periodicity axis is four, and the direction of periodicity is eight, specifically, the upward periodicity, the downward periodicity, the rightward periodicity, the leftward periodicity and the two oblique periodicities, with one concave portion being as the center.

Furthermore, as shown in FIG. 15(c), for example, the laser light is divided into 25 (5×5) laser beams by the micro-laser. Of these, if the laser beam positioned at the intersection of column 2 and row 2, the laser beam positioned at the intersection of column 2 and row 4, the laser beam positioned at the intersection of column 3 and row 3, the laser beam positioned at the intersection of column 4 and row 2, and the laser beam positioned at the intersection of column 4 and row 4 pass in correspondence with the mask opening, coarse dot-like periodic structural pattern is recorded. At this time, the number of axis of periodicity is 4, and the direction of periodicity is eight, specifically, the upward periodicity, the downward periodicity, the rightward periodicity, the leftward periodicity and the two oblique periodicities, with one concave portion being as the center.

As apparent from the above, the periodic structural pattern varies depending on the combination of the light division pattern of the micro-lens array and the mask opening pattern. As a result, optical information can be recorded utilizing diffraction as a sort of bar code.

[Method for Reading a Marking]

Then, a method for reading a marking is explained.

Here, the "method for reading a structural color or diffraction light" is explained first, and the "method for truth/false discrimination by using a structural body" is explained next.

(Method for Reading a Structural Color or Diffraction Light)

Figure 16:
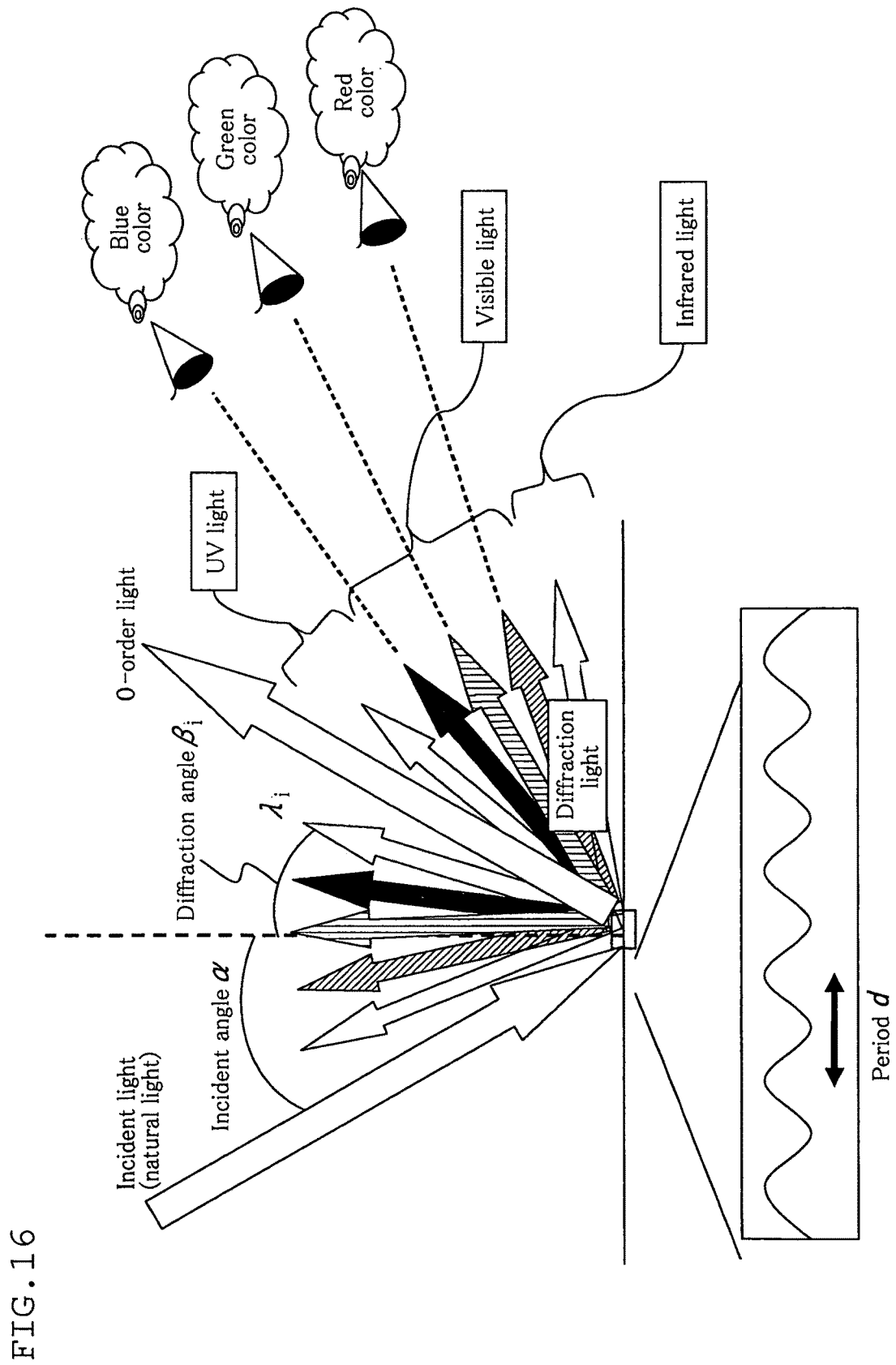
FIG. 16 is a diagrammatical view showing a manner in which optical diffraction occurs.

As shown in FIG. 16, if light is incident on a surface having a one-dimensional periodic structure (e.g. a reed screen-like structure) or a two-dimensional periodic structure (e.g. a lattice structure), the light is divided at different angles (scattered) for different wavelengths. This phenomenon is called "diffraction". The "diffraction light" means all of the light scattered by diffraction. Here, "0-order light" means light remained without being diffracted.

If natural light (sun light, for example) is used as a light source, light in the UV region, visible region and infrared region is diffracted at different angles. At this time, diffracted light in the visible region (same as the light in other wavelength regions) is diffracted at different angles for each wavelength (that is, separated). Therefore, a different color is seen depending on the position at which diffraction light in the visible region is visually observed. The "structural color" as referred to herein means diffracted light in the visible region or a color observed by the diffraction light in the visible region.

Here, the visible region is a wavelength region which can be observed by human eyes, and has a wavelength of about 400 to 700 nm. A wavelength region shorter than the visible region is referred to as the "UV region" and a wavelength region longer than the visible region is referred to as the "infrared region", and these wavelength regions cannot be observed by human eyes.

An angle $\beta$ at which light having a specific wavelength is diffracted can be obtained by the following formula using a wavelength $\lambda$, an incident light $\alpha$ and a period d of the periodic structure:

$$d(\sin \alpha \pm \sin \beta) = m\lambda \qquad \text{formula 3}$$

Here, m indicates the order of diffraction.

For example, when a monochromatic spotlight like a laser beam is incident on a marking, spot-like diffraction light appears only at a specific angle. If a surface having a marking is uniformly irradiated with monochromatic optical diffraction occurs only at the portion of the marking. Diffraction light appears in the same shape as that of the marking only at the specific angle.

Here, the marking indicates a graphic, a letter or the like formed by adequately arranging areas in which diffraction-causing portions are uniformly formed or by adequately arranging diffraction-causing portions.

From the above, "reading diffraction light" or "reading a structural color" indicates any of the following.

i. Detecting diffraction light at a diffraction angle obtained from the formula 3 by using a known lattice period when known monochromatic light is incident at a specific angle;

ii. Measuring an angle at which diffraction light is detected when known monochromatic light is incident at a specific angle;

iii. At a diffraction angle obtained from the formula 3 using a known lattice period, measuring an angle capable of detecting diffraction light at which known monochromic light is incident;

iv. When light including a plurality of wavelengths is incident at a specific angle, detecting diffraction light having a specific wavelength at a diffraction angle obtained from the formula 3 by using a known lattice period;

v. When light including a plurality of wavelengths is incident, measuring an angle capable of detecting diffraction light having a specific wavelength; and vi. At a diffraction angle obtained from the formula 3 using a known lattice period, measuring an angle capable of detecting diffraction light having a specific wavelength at which light including a plurality of wavelengths is incident.

If spot light is incident, the above-mentioned diffraction light is in the form of a spot, and if uniform light is incident on a surface including a marking, the diffraction light has the same shape as that of the marking.

Here, the "reading diffraction light" and the "reading a structural color" differ as follows.

"Reading diffraction light" is one of the above-mentioned methods applied for diffraction light in any of the UV region, the visible region and the infrared region. "Reading a structural color" is one of the above-mentioned methods applied for diffraction light in the visible region.

In the case of the "reading diffraction light", diffraction light in the visible region is detected by human eyes in addition to a light receiver (detector). On the other hand, in the case of the "reading a structural color", the structural color is detected by both human eyes and a light receiver.

By observing whether diffraction light can be detected or not by the above-mentioned "reading" method or by observing the measured angle, it can be judged whether or not the value of the lattice period is the one which has already been known.

Irradiating a surface including a marking with natural light, and observing, at an angle of visible observation, a different color and the shape of a marking correspond to iv. as mentioned above.

The "truth/false discrimination by using a structural body" is a method in which the substrate surfaces of the structural body to be judged and the substrate surface of the structural body for comparison are brought into contact with a functional material, and the "reading diffraction light" or the "reading a structural color" in the cavity interface structures of both structural bodies is performed, and the results (detection of diffraction light or a structural color, measured angle) are compared. If the results coincide, the object having the structural body to be judged is verified to be genuine. If the results do not coincide, the object is verified to be a forgery.

[Truth/False Discrimination Method by Using a Structural Body]

Figure 17:
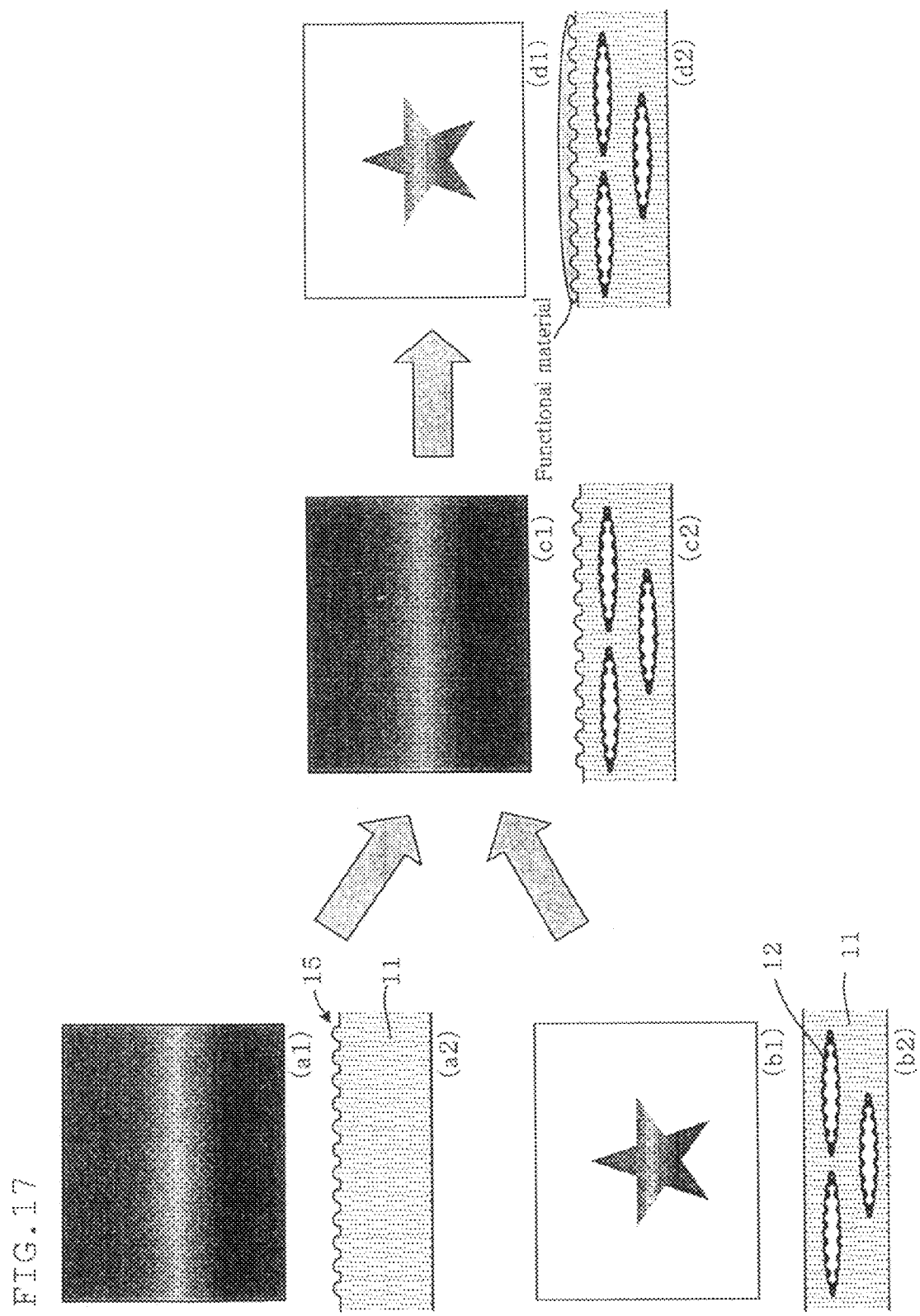
FIG. 17 is a view for explaining the truth/false discrimination method using the structural body of this embodiment, in which (a1) and (a2) are views showing a structural color developed when the substrate surface periodic structure is formed; (b1) and (b2) are views showing a structural color developed when the cavity interface periodic structure is formed; (c1) and (c2) are views showing a structural color developed when the substrate surface periodic structure and the cavity interface periodic structure are formed; and (d1) and (d2) are views showing a structural color developed when a functional material is brought into contact with the substrate surface periodic structure.

As shown in FIGS. 17(*a*1) and 17(*a*2), if the substrate surface periodic structure 15 is formed over the entire substrate surface 14 of the structural body 10, a structural color by the substrate periodic structure 15 is developed entirely on the substrate surface 14.

On the other hand, as shown in FIGS. 17(*b*1) and 17(*b*2), if a plurality of the cavity interface periodic structure 13 is formed within a star-shaped region which is the part of the substrate surface 14 of the structural body 10, a structural color is developed by the cavity interface periodic structure 13 within the star-shaped region.

If these are combined, and both the substrate surface periodic structure 15 and the cavity interface periodic structure 13 are formed in the substrate 11, as shown in FIGS. 17(*c*1) and 17(*c*2), only the structural color caused by the substrate surface periodic structure 15 can be visually observed, and the structural color caused by the cavity interface periodic structure 13 is hidden. The reason therefor is as follows. If the structural color by the substrate surface periodic structure 15 and the structural color by the cavity interface periodic structure 13 are both developed, the structural color developed by the substrate surface periodic structure 15 is strong, while the structural color developed by the cavity interface periodic structure 13 is weak. As a result, human eyes can detect only a color which is developed strongly. The same can be applied to diffraction light if the light receiver is set as in the case of human eyes such that the weak light cannot be detected and the strong light can be detected.

Here, as shown in FIG. 17(*d*2), a functional material having a refractive index which is the same or close to that of the substrate 11 is brought into contact with the substrate surface 14. As a result, as shown in FIG. 17(*d*1), development of a structural color by the substrate surface periodic structure 15 is suppressed, and a marking, which is a structural color developed by the cavity interface periodic structure 13, can be visibly observed.

As mentioned above, whether an object is genuine or not can be easily verified by observing whether a marking appears or not, or by judging the graphic or letter of the appeared marking coincides with a desired graphic or letter.

The above-mentioned suppression of a structural color utilizes the phenomenon in which reflectance at the interface is decreased if a difference in refractive index of two adjacent media is decreased. This is because the amount of diffraction light (structural color) from the periodic structure decreases due to a decrease in the amount of reflected light which is caused by a lowering in reflectance.

The functional material is a material which covers the details of the substrate surface structure when brought into contact with or adhered closely to the substrate surface, and the surface which is in contact with the substrate surface and the surface which is opposite to the surface which is in contact with the substrate surface is smooth. It suffices that the surface may be microscopically smooth. The surface may be flat or curved if viewed macroscopically.

Both a liquid and solid functional material may be used. Examples of the liquid functional material include water, oil such as glycerin and organic solvents such as benzene, acetone, isopropyl alcohol, xylene, toluene, ethyl alcohol and methyl alcohol. Examples of the solid functional material include an adhesive material or a sticky material included in a seal body or the like. The functional material is, however, not limited thereto.

The above-mentioned reading method is not limited to the structural body of the invention. The reading method can be applied, for example, to a multi-layer hologram structural body in which a relief-type hologram is formed on the outer surface and the layer interface of the structural body having a plurality of layers.

In FIGS. 17(*a*1) and 17(*a*2), the periodic structure is formed on the entire substrate surface 14. The formation of the periodic structure is not necessarily formed on the entire substrate surface. For example, the periodic structure may be formed in such a manner that it covers a range in which the cavity interface periodic structure 13 is formed. That is, it suffices that a graphic or letter formed by a structural color which is developed by the cavity interface periodic structure 13 is unable to be judged by the development of a structural color developed by the substrate surface periodic structure 15.

In addition, the marking by the cavity interface periodic structure 13 is not limited to a star-shaped marking as shown in FIG. 17(*b*1). The marking can be formed in any shape such as a graphic, a designation, a letter or the like.

As shown in FIG. 5, in the case of the structural body 10 having a protective layer 16, whether an object is genuine or not is verified by the following method.

When the protective layer 16 is provided, the above-mentioned method for reading a marking cannot be performed. Therefore, to prevent the marking inside of the substrate from being hidden, different markings are provided both on and inside of the substrate 14. At this time, different markings appear depending on the direction or the viewing angle. Whether an object is genuine or not is verified by observing whether different markings appear or not, or by observing what kinds of graphics or letters appear.

The above-mentioned method for reading a marking is performed by removing the protective layer 16 according to need.

For example, the protective layer 16 may be a peelable seal-like film which is attached on the outermost surface of the structural body or a film which can be removed by friction.

[Examples of Formation of a Structural Body]

Examples of the formation of a structural body are explained below.

Example 1

By passing the light beam emitted from a Q-switch pulse YAG laser through a transmitting diffraction optical device, the light beam was divided into a plurality of light beams. Each of the light beams was caused to pass through a synthetic quartz flat convex lens with a focal length of 200 mm, which was placed 200 mm away from the transmitting diffraction optical device. At a position where the light beams which had passed the lens was focused, unnecessary light beams were hidden by a mask, thereby allowing only necessary light beams to pass through. The light beam which had passed through was focused by means of a synthetic quartz convex lens having a focal length of 100 mm. The light beam was caused to intersect and interfere. A biaxial elongated PET sheet was irradiated with the interference area. In advance, irradiation was performed with a laser beam having a wavelength of 355 nm (transmission for PET sheet of 83%).

Then, the wavelength was switched to 266 nm (transmittance for PET sheet: 0.3%), and irradiation was performed.

The two-dimensional lattice period of the diffraction optical device was 6 μm. The pulse YAG laser has the following specification:

Pulse width: 5 ns
Repeated frequency: 10 Hz

When the laser wavelength was 355 nm, the average power of irradiated light was 1.35 W. Since the irradiated area was 4.5 mmφ, the light power density per unit area was 1 W/cm$^2$.

As a result of 25 laser shots, cavities were generated in the inside of the elongated PET sheet, and in the interface of the cavity, two-dimensional periodic structure with a period of 1.5 μm was formed. A structural color caused by this structure could be observed.

Similarly, at a laser wavelength of 266 nm, the average power of the irradiated light was 240 mW. Since the irradiated area was 4.5 mmφ, the density of light power per unit area was 179 mW/cm$^2$.

As a result of a single laser shot, a two-dimensional periodic structure with a period of 1 μm was formed on the outside surface of the elongated PET sheet. A structural color caused by this structure was observed.

If the cavity 12 was formed under the conditions of Example 1, a microscopic observation as shown in FIGS. 2*d* and 2*e* was obtained. The conditions under which the cavity 12 was formed are not those described in Example 1.

Figure 18:
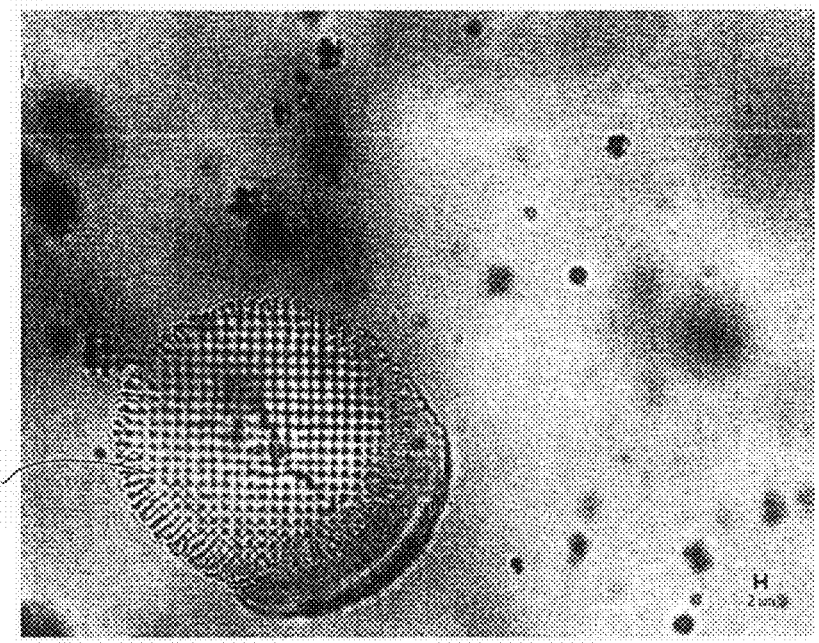
FIG. 18 is a view showing a manner in which a cavity 12 is formed under the following conditions:
YAG-THG (355 nm), 247 mJ/cm$^2$, 30 laser shots, a PET-INJ sheet as a sample 30.

For example, the cavity 12 formed by using a PET-INJ sheet as a sample 30 under the condition of YAG-THG (355 nm), 247 mJ/cm$^2$ and 30 laser shots had a shape shown in FIG. 18.

Figure 19:
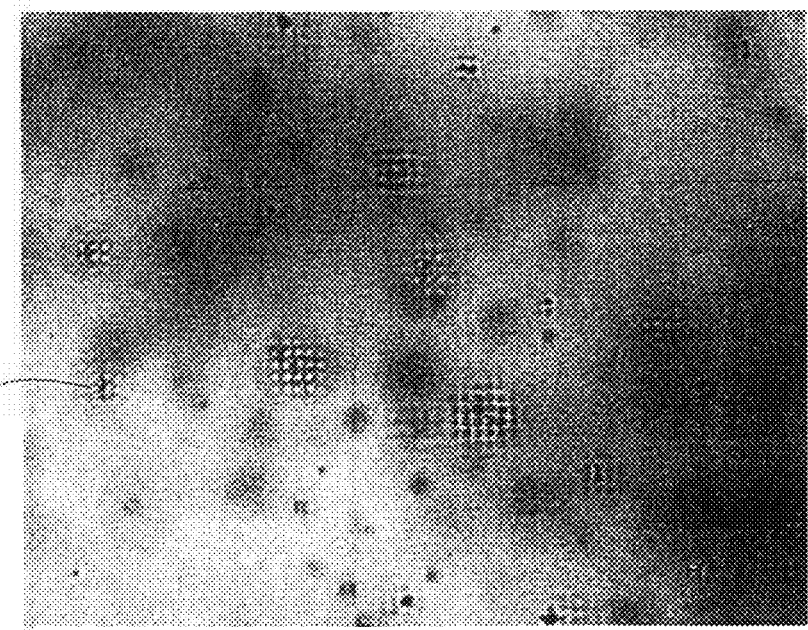
FIG. 19 is a view showing a manner in which a cavity 12 is formed under the following conditions:
YAG-SHG (532 nm), 500 mJ/cm$^2$, 10 laser shots, an elongated PET sheet as a sample 30.

Furthermore, the cavity 12 formed by using a PET-INJ sheet as the sample 30 under the condition of YAG-SHG (532 nm), 500 mJ/cm$^2$ and 10 shots had a shape shown in FIG. 19.

Example 2

A biaxial elongated PET sheet was irradiated with a laser having a wavelength of 266 nm in the same manner as in Example 1. A structural color was observed by the formed two-dimensional periodic structure.

To this periodic structure, an ester oil (CAS-Nr: 195371-10-9) having a refractive index of 1.518 which is close to that of the elongated PET sheet (1.64) was applied. As a result, the sheet was observed like the original transparent elongated PET sheet since no structural color was observed.

[Comparison with Comparative Examples]

Next, comparison between the structural body of this embodiment and the structural body of the comparative example is explained with reference to FIGS. 20 to 22.

(Comparison Between the Cavity of this Embodiment and Pores of the Comparative Example)

JP-A-2004-359344 discloses a technology of developing a color by forming a plurality of fine pores ("Plastic package and a method for decorating the same", hereinafter abbreviated as "Comparative Example 1").

The structural body of Comparative Example 1 and the structural body of this embodiment are compared to clarify the difference.

(1) Structure to be Formed is Different

In Comparative Example 1, the pores formed by gasification due to heat generation are arranged according to the periodic light intensity distribution.

On the other hand, in the invention, cavities are formed by a photochemical reaction between laser light and a material, and a periodic structure is formed in the interface according to a periodic light intensity distribution. The cavities are not necessarily formed periodically.

The structure of the pore of Comparative Example 1 and the structure of the cavity of the invention are shown in FIG. 20.

As shown in FIG. 20, each of the pores of Comparative Example 1 is formed in an almost spherical shape, and a plurality of pores was arranged in a periodic arrangement structure, enabling decoration to be enabled.

On the contrary, in the invention (Example), a periodic structure is formed in the interface of the cavity, and this periodic structure has a regular arrangement which enables decoration.

(2) Sample is Different

In Comparative Example 1, since heat generation by laser light irradiation is utilized, a light-absorbing heat generator was kneaded to efficiently convert light energy to heat energy.

In contrast, in the invention, use of a specific additive is not necessary.

The difference between these samples is shown in FIG. 21. As shown in FIG. 21, in Comparative Example 1, an injection-molded PET sheet (thickness: 1.5 mm) to which a light-absorbing heat generator had been kneaded was used as a sample. The transmittance at a wavelength of 355 nm was 0%. At this time, the light was penetrated into the inside of the material, and the transmittance was 0% as a result of exponential decay. In contrast, in the invention (Example), a biaxial elongated PET sheet (thickness: 150 μm) was used as a sample, and the transmittance was 83%.

(3) Formation Principle is Different

The method in Comparative Example 1 is a method in which heat generation by laser beam irradiation is utilized. In contrast, in the invention, a structural body is formed by using laser light irradiation, without using heat generation.

Here, the laser light irradiation conditions in the Example of the invention and the laser light irradiation conditions of Comparative Example 1, which is described in the background of the JP-A-2004-359344 as the third embodiment, are shown in FIG. 22. In FIG. 22, the axis of abscissa shows fluence (photoenergy per area irradiated with one pulse) and the axis of ordinates shows the irradiation pulse number.

In FIG. 22, ○ indicates the conditions under which the cavity 11 is formed in the structural body of the invention, x indicates the conditions under which the cavity 11 is not formed and ◆ indicates the conditions under which the pore is formed in Comparative Example 1.

As shown in FIG. 22, the method for forming a structural body of the invention needs only a smaller irradiation pulse number as compared with Comparative Example 1. This is because heat generation is not used in forming the structural body.

It is also understood that the forming method of the invention needs a smaller fluence as compared with Comparative Example 1.

(Comparison Between the Structural Body of this Embodiment and Conventional Forgery-Protection Marking)

As forgery-protection markings, "Transparent hologram seal" disclosed in Japanese Patent No. 2797944 (hereinafter referred to as "Comparative Example 2") and "Forgery-proof marking for objects and a method for identifying such a marking" disclosed in JP-A-2004-538586 (hereinafter referred to as "Comparative Example 3") can be given.

Here, the structural body in each comparative example and the structural body of this embodiment are compared to clarify the difference.

(In the Case where a Structure is Different)

The structural body of Comparative Example 2 has a multi-layer structure composed of a ceramic material having a low refractive index and a ceramic material having a high refractive index on the surface of the hologram layer surface. The structural body of Comparative Example 3 has a layer with a structure generating holographic effects and a layer in which metal clusters with a diameter of 100 nm or less are dispersed.

In contrast, in the invention, the structural body has a single-layer structure having a fine periodic structure generating a structural color (holographic effects) in the inside and the outside of the substrate (layer).

In each comparative example, both structural bodies are structural bodies to be attached to an object for forgery protection. Therefore, they are in the form of a seal which has an adhesive layer.

On the other hand, since the structural body of the invention is formed within an object to be protected from being forged, no such adhesive layer is provided.

(Verification Method is Different)

In Comparative Example 2, truth/false discrimination is enabled by a unique color tone generated from the multi-layer structure composed of a ceramic material.

In Comparative Example 3, truth/false discrimination is enabled by comparing the spectrum of light reflected by the forgery-protection marking with a predetermined spectrum.

In the invention, truth/false discrimination is enabled by visually observing or by detecting a structural color and/or diffraction light derived from the inside by suppressing a structural color and/or diffraction light derived from the substrate surface. In addition, the visually observed or detected information is compared with the information for comparison, thereby verifying whether an object is genuine or not.

As mentioned hereinabove, according to the structural body, the method for forming a structural body, the apparatus for forming a structural body, the method for reading a structural color and/or diffraction light and the truth/false discrimination method of the invention, a cavity is formed in the inside of a material to be irradiated, and a periodic structure having a periodic intensity distribution of irradiation light is formed in the interface of the cavity.

As a result, the structural body may have resistance to scars or spots which cause color developability to be lowered. Furthermore, by forming the cavity three-dimensionally, color developability can be significantly improved. In addition, due to the shortened formation time, productivity can be enhanced. As mentioned above, while satisfying the requirements for practically putting a structural color into practical use, decoration of a material is enabled with a high degree of recycling properties.

Since no chemical colorant such as a pigment and a dye is used, the structural body of the invention is a material which imposes a lesser burden on the environment due to the decrease in use of the amount of chemicals.

Furthermore, in the structural body of the invention, decoration is made by a periodic structure formed in the interface of the cavity. Therefore, the decoration can be deleted easily by heating and kneading (re-pelletizing) at the time of recycling. Therefore, although the structural body is decorated when used as a container, it becomes colorless and transparent after re-treatment, and hence, exhibits a high degree of recycling properties.

In addition, unlike chemical color development, since a vivid color tone having a deep shade and gloss can be obtained, differentiation of products can be performed effectively by decoration.

Furthermore, by using a structural color and/or diffraction light due to the periodic structure formed in the structural body itself, it is possible to verify whether an object is genuine or not. In addition, since the periodic structure is formed in the inside of the structural body, it is impossible to remove it for application to other objects. Therefore, unlike the conventional hologram seal, the act of removing and reusing by attaching to a forgery product with the aim of allowing the forgery product to be put on the market as a genuine product can be prevented.

In addition, since the periodic structure is formed on a single substrate, it is not required to form a complicated structure by combining a plurality of materials. Therefore, constitution of the material can be simplified, thereby eliminating an increase of the raw material cost.

Furthermore, since the periodic structure can be formed by light irradiation, the structural body can be formed at a low cost without the need of introducing an expensive apparatus for forming the structural body.

Furthermore, by forming the cavity interface periodic structure and the substrate surface periodic structure on the substrate and by bringing the substrate surface periodic structure into contact with a functional material, development of a structural color caused by the substrate surface periodic structure is suppressed to enable a structural color developed by the cavity interface periodic structure to be read. As apparent from the above, since a structural color caused by the cavity interface periodic structure can be read only by bringing a functional material into contact with the substrate surface periodic structure, even a consumer can verify easily whether an object is genuine or not.

Hereinabove, the preferred embodiments of the structural body, the method for forming a structural body, the apparatus for forming a structural body, the method for reading a structural color/diffraction light and the truth/false discrimination method of the invention are explained. However, the structural body, the method for forming a structural body, the apparatus for forming a structural body, the method for reading a structural color and/or diffraction light and the truth/false discrimination method of the invention are not limited to the above-mentioned embodiments. It is needless to say that various modifications are possible within the scope of the invention.

For example, in the above-mentioned embodiments, PET was used as the sample. PET can be used, for example, as a material for containers, cups, pouches, trays, and tubular containers. In this case, the invention can be provided as a technology of decorating plastic containers with a high degree of recycling properties.

In the above-mentioned embodiment, the substrate surface periodic structure is formed only on one surface of the substrate. However, the substrate surface periodic structure is formed not only on a single surface, but may be formed on two or more surfaces. For example, the substrate surface periodic structure may be formed on both sides of a sheet element, or on two or more sides of a cubic element.

In the above-mentioned embodiment, a forgery-protection marking is given as the application of the invention. The application of the invention is not limited to the forgery-protection marking. For example, the invention can be applied to decoration, utilizing the effect in which an internal marking appears by the above-mentioned reading method.

INDUSTRIAL APPLICABILITY

The invention is provided for realizing development of a structural color on the industrial scale. Therefore, the invention can be applied to a field where a material requiring decoration is used.

The invention claimed is:

1. A structural body, comprising:
a substrate having a cavity with a periodic structure causing an optical diffraction being formed in an interface of the cavity, wherein the cavity is an empty space,
the periodic structure has a plurality of concave portions and convex portions in an entire circumference of the interface,
the concave portions and convex portions are formed in a substantially equally spaced interval between the concave portions and the convex portions, and
the periodic structure in the interface of the cavity has a regular arrangement which develops a structural color.

2. The structural body according to claim 1, wherein a plurality of the cavities is formed at different depths from a surface of the substrate.

3. The structural body according to claim 1, wherein the periodic structure causing the optical diffraction is formed on a part or a whole of the substrate.

4. The structural body according to claim 3, wherein the periodic structure formed on a surface of the substrate has a regular arrangement which develops a structural color.

5. The structural body according to claim 3, further comprising a protective layer for protecting the periodic structure formed on a surface of the substrate.

6. The structural body according to claim 3, wherein the periodic structure on a surface of the substrate is formed at a position where a structural color and/or diffraction light caused by the periodic structure formed in the inside of the interface of the cavity is hidden.

7. The structural body according to claim 3, wherein the periodic structure of the interface of the cavity and/or the periodic structure on a surface of the substrate is formed by light irradiation.

8. The structural body according to claim 7, wherein the periodic structure of the interface of the cavity and/or the periodic structure of the surface of the substrate is formed by light irradiation which generates a periodic intensity distribution.

9. The structure body according to claim 1, wherein the substrate includes a plurality of cavities formed separately inside the substrate, said plurality of cavities being arranged horizontally and vertically inside the substrate.

10. A method for reading a structural color and/or diffraction light, comprising:
preparing a structural body comprising a substrate having a cavity with a periodic structure causing optical diffraction being formed in an interface thereof,
contacting the structural body with a functional body having a refractive index which is same or close a refractive index of the substrate of the structural body thereby suppressing a structural color and/or diffraction light caused by the periodic structure on a surface of the substrate, and
reading a structural color and/or diffraction light caused by a cavity interface periodic structure in an inside of the substrate,
wherein the periodic structure causing the optical diffraction is formed on a part or a whole of the substrate.

11. A truth/false discrimination method, comprising:
preparing a structural body comprising a substrate having a cavity with a periodic structure causing optical diffraction being formed in an interface thereof,
contacting a structural body with a functional material having a refractive index which is same or close to a refractive index of the substrate of the structural body thereby suppressing a structural color and/or diffraction light caused by a periodic structure on a surface of the substrate,
reading a structural color and/or diffraction light caused by a periodic structure in the interface of a cavity in an inside of the substrate,
comparing the structural color and/or the diffraction light which has been read with a structural color and/or diffraction light of a structural body for comparison, and
judging that an object having the structural body is genuine when the structural color and the diffraction light of the structural body coincide with the structural color and diffraction light of the structural body for comparison,
wherein the periodic structure causing the optical diffraction is formed on a part or a whole of the substrate.

* * * * *